(12) United States Patent
Growcock et al.

(10) Patent No.: US 6,838,082 B2
(45) Date of Patent: Jan. 4, 2005

(54) VERMICULTURE COMPOSITIONS

(75) Inventors: Fredrick Growcock, Houston, TX (US); G. Wray Curtis, Houston, TX (US); John Candler, Houston, TX (US); Stephen Rabke, Houston, TX (US); Sonya Ross, New Plymouth (NZ); Jonathan Getliff, Banchory (GB); Greg McEwan, New Plymouth (NZ)

(73) Assignee: M-I LLC, Houston, TX (US)

( * ) Notice: Subject to any disclaimer, the term of this patent is extended or adjusted under 35 U.S.C. 154(b) by 0 days.

(21) Appl. No.: 10/075,747

(22) Filed: Feb. 14, 2002

(65) Prior Publication Data

US 2003/0098180 A1 May 29, 2003

Related U.S. Application Data

(60) Provisional application No. 60/298,765, filed on Jun. 16, 2001, provisional application No. 60/269,752, filed on Feb. 19, 2001, provisional application No. 60/269,204, filed on Feb. 15, 2001, and provisional application No. 60/268,635, filed on Feb. 14, 2001.

(51) Int. Cl.[7] .......................... A01N 65/00; C10G 32/00
(52) U.S. Cl. ...................................... 424/93.7; 435/281
(58) Field of Search .............................. 435/243, 262.5, 435/325, 281; 424/93.7

(56) References Cited

U.S. PATENT DOCUMENTS

| | | |
|---|---|---|
| 2,867,055 A | 1/1959 | Lebiedzinski |
| 3,635,816 A | 1/1972 | Golub |
| 3,654,903 A | 4/1972 | Montgomery |
| 3,661,549 A | 5/1972 | Freytag et al. |
| 4,187,940 A | 2/1980 | Ratliff et al. |
| 4,262,633 A | 4/1981 | Taboga |
| 4,696,353 A | 9/1987 | Elmquist et al. |
| 4,725,362 A | 2/1988 | Dugat |
| 4,942,929 A | 7/1990 | Malachosky et al. |
| 5,120,160 A | 6/1992 | Schwengel |
| 5,132,025 A | 7/1992 | Hays |
| 5,333,698 A | 8/1994 | Van Slyke |
| 5,336,290 A | 8/1994 | Jermstad |
| 5,451,523 A | 9/1995 | Von Fahnestock et al. |
| 5,545,801 A | 8/1996 | Fulton |
| 5,609,668 A | 3/1997 | Gill |
| 5,720,130 A | 2/1998 | Bost |
| 6,020,185 A | 2/2000 | Hince et al. |
| 6,153,017 A | 11/2000 | Ward et al. |
| 6,187,581 B1 | 2/2001 | Sicotte et al. |
| 6,223,687 B1 | 5/2001 | Windle |
| 6,381,899 B1 | 5/2002 | McDole |
| 6,548,294 B1 * | 4/2003 | Ritter et al. ............. 435/290.4 |

FOREIGN PATENT DOCUMENTS

| | | | |
|---|---|---|---|
| WO | 95/06694 | 3/1995 | ............ C09K/7/06 |
| WO | 97/34963 | 9/1997 | ............ C09K/7/06 |
| WO | 99/51545 | 11/1999 | |

OTHER PUBLICATIONS

Russian Patent No. RU2115639 (Abstract) "Apparatus for Processing Waste to Yield Biohumus and Vermiculture," Published Jul. 20, 1998.

Russian Patent No. 2115640 (Abstract) "Biohumus and Vermiculture Production Apparatus," Published Jul. 20, 1998.

Russian Patent No. RU2119902 (Abstract) "Method of Processing Solid Organics–Containing Wastes,"Published Oct. 10, 1998.

Russian Patent No. RU2103868 (Abstract) "Method of Preparing Substrate For Growing Vemiculture and Method of Growing Vermiculture," Published Feb. 10, 1998.

Promising Research Abstract PRA–2124, "Bioremediation of Soils Polluted by Toxic Chemical Substances," Research Center for toxicology & Hygienic Regulation of Biopreparations, Moscow, Russia. (Publishing date unknown).

"Designing Invert Drilling Fluids to yield Environmentally Friendly Drilled Cuttings," F.B. Growcock et al., IADC/SPE #74474, Dallas, Texas, Feb. 26–28, 2002.

"Drilling Fluid Design and the use of Vermiculture for the Remediation of Drill Cuttings," Jonathan Getliff et al., AADE–02–DFWM–HO–16, Houston, Texas, Apr. 2–3, 2002.

Noke, A. et al., "Intensive treatmet of mineral oil–contaminated drilling cuttings" Chemical Abstracts, Columbus, Ohio, vol. 134, abstract No. 192840, (2000).

Bauder, T. A. et al, "Waste management: drilling fluid effects on crop growth and iron and zinc availability" Chemical Abstracts, Columbus, Ohio, vol. 131, abstract No. 4744, (1999).

\* cited by examiner

*Primary Examiner*—David M. Naff
*Assistant Examiner*—Deborah K. Ware
(74) *Attorney, Agent, or Firm*—Howrey, Simon, Arnold & White, LLP

(57) ABSTRACT

A biodegradable wellbore fluid with an oleaginous phase including a linear paraffin having 11–18 carbon atoms, a non-oleaginous phase, an emulsifying agent and optionally a weighting agent. Use of the fluid while drilling allows bio-remediation of drill cuttings using land spreading, bioreactors, conventional composting or vermiculture composting. The resulting product, especially when vermicomposed, is potentially useful as a soil amendment or plant fertilizer material.

12 Claims, 20 Drawing Sheets

Oxygen Uptake Rate (OUR) as a Function of Temperature on Simulated Cuttings in Bioreactor Oxygen Uptake Rate (OUR) and Residual Oil on Cuttings
on Simulated Cuttings in M-I Lab Bioreactor at 30°C Composting trial showing chromatographic analysis of hydrocarbon content of cuttings over a period of 42 days (the seven groups of bars correspond to seven individual components)

Total hydrocarbons by GC-FID (OIEWG carbon bands; mg/kg dry wt) – First Test

Background hydrocarbonconcentrations by GC-FID (OIEWG carbon bands; mg/kg dry wt)
— Second Test Hydrocarbon concentrations by GC-FID (OIEWG carbon bands; mg/kg dry wt) 30% w/w application rate – Second Test Hydrocarbon concentrations by GC-FID (OIEWG carbon bands; mg/kg dry wt) 50% w/w application rate – Second Test Hydrocarbon concentrations by GC-FID (OIEWG carbon bands; mg/kg dry wt) 70% w/w application rate – Second Test Hydrocarbon concentrations by GC-FID (OIEWG carbon bands; mg/kg dry wt) 100% w/w application rate – Second Test Average hydrocarbons concentrations by GC-FID (OIEWG carbon bands; mg/kg dry wt) for all application rates – Second Test Soil pH – Second Test Electrical Conductivity – Second Test Soluble Salts Concentration – Second Test Ammonimum Nitrogen Concentration – Second Test Nitrate Nitrogen Concentration – Second Test Nitrite Nitrogen Concentration – Second Test Phosphate Phosphorous Concentration – Second Test Barium Concentration in Soil Samples at the Start and Finish of the Test- Second Test Heavy Metal Concentration in Earth Worms Fed at Different Application Rates
Second Test

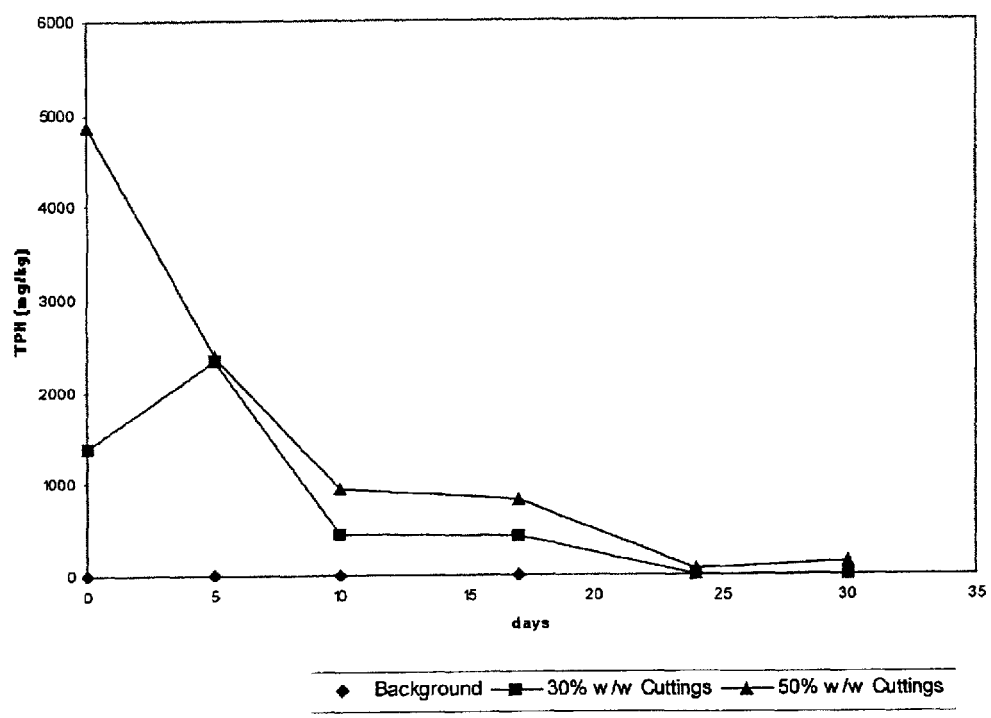
Fig.20 Hydrocarbon concentrations by GC-FID (OIEWG carbon bands; mg/kg dry wt) – Third Test

VERMICULTURE COMPOSITIONS

This application claims the priority benefit of U.S. Provisional Application No. 60/268,635, filed Feb. 14, 2001, and U.S. Provisional Application No. 60/269,204, filed Feb. 15, 2001, and U.S. Provisional Application No. 60/269,752, filed Feb. 19, 2001, and U.S. Provisional Application No. 60/298,765, filed Jun. 16, 2001.

BACKGROUND OF THE INVENTION

Drill cuttings are the earth, rock and other solid materials generated during the rotary drilling of subterranean wells. The drill cuttings are removed from beneath the drill bit by a stream of drilling fluid that suspends the solids and carries the solids to the surface. On the surface, the drill cuttings are separated from the drilling fluid in a drilling cuttings separator or shaker and the drill cuttings are collected at the drill site for subsequent treatment.

Traditional oleaginous drilling fluids, also known as oil-based drilling fluids or invert emulsion drilling fluids (if they contain an internal non-oleaginous phase), may be harmful to marine life due to the presence of aromatic hydrocarbons in the diesel fuel or other similar petroleum fractions used as the continuous phase. The development of low-toxicity mineral oil-based drilling fluids—with very low fractions of aromatic compounds—allayed much, but not all, of the concern over acute toxicity effects on marine flora and fauna. However, discharge of mud-laden cuttings still produces a mound of cuttings on the ocean floor that may smother any marine life that resides on the seabed.

Development of synthetic-based drilling fluids as alternatives to conventional oil-based drilling fluids in offshore operations was precipitated by residual toxicity and biodegradability concerns. These developments focused on the fate and effects of oil-coated drilled cuttings discharged into the sea, as well as worker safety. For onshore applications, cuttings disposal is also of importance. However, since the drilled cuttings are disposed of on land, the environmental issues focus primarily on subsequent usability of the land and contamination of ground water. Although the advent of synthetic-based fluids has greatly improved the environmental acceptability of non-aqueous drilling fluids both offshore and onshore, current synthetic-based fluid formulations still present problems for direct land treatment of oil-coated cuttings resulting from onshore operations. The concerns with pollution of soil and groundwater by synthetic based fluids and oil-based fluids have led to increasingly strict government regulations.

Oily drill cuttings can have severe impacts on their receiving environment and should be cleaned or treated to minimize their environmental impact and the operator's long term liability. The primary purpose of each of these methods is to somehow destroy or remove the drilling fluid residue from the earth solids. In addition to the above mentioned method of land treatment (spreading and farming), there is a litany of other ways to treat oil-coated cuttings from drilling operations. These include landfill disposal; bioremediation; stabilization/solidification (briquetting, fixation with silicates or fly ash); extraction or washing (oil, detergents, and solvents); and thermal treatment (incineration and distillation, including thermal desorption and hammer mill). The treatment of drill cuttings is the subject of a number of patent applications and literature disclosures that include U.S. Pat. Nos. 6,187,581; 6,020,185; 5,720,130; 6,153,017; 5,120,160; 5,545,801; 4,696,353; 4,725,362; 4,942,929; 5,132,025. These patents describe various methods of treating oily drill cuttings including incineration; reinjection of the slurrified cuttings into another subterranean formation; chemical washing and landfill disposal; and other methods. As noted above, the primary purpose of each of these methods is to somehow destroy or remove the drilling fluid's residue from the earth solids.

Despite considerable research conducted in the area of drill cuttings disposal, there remains an unmet need for a clean, inexpensive and environmentally friendly drilling fluid and method of treating the drill cuttings such that they produce an end product that may have a beneficial use.

SUMMARY OF THE INVENTION

The present invention is generally directed to a drilling fluid, a method of drilling, and a method of treating drilling fluid waste. In particular, the present invention provides a biodegradable, low-toxicity drilling fluid which enables bio-remediation of drill cuttings into a beneficial product using land spreading or farming with optional pre-treatment in bioreactors or through composting.

An oleaginous drilling fluid has been developed that possesses the drilling properties of conventional oil-based and synthetic-based drilling fluids but which can be discharged (as fluid-coated drilled cuttings) onto land to provide minimal detrimental effects on animal and plant life. The individual components of this environmentally friendly fluid—base fluid, internal non-oleaginous phase (if the oleaginous drilling fluid is an invert emulsion), emulsion stabilizers, wetting agents, fluid-loss reducing agents and weighting agent—also possess these attractive features.

The drilling fluid may be used without any treatment of the drilled cuttings in areas where restrictions on farming or spreading of the cuttings on land have prohibited use of a typical synthetic-based fluid or oil-based fluid. For areas where restrictions are even more severe, e.g. where essentially zero discharge is required, the drilling fluid may be used in conjunction with rapid bio-remediation or other pre-treatment to produce cuttings with less than 1% residual base fluid.

The present invention also encompasses methods of bioremediation of the drilling cuttings generated during drilling operations using the fluids disclosed herein. IN one such preferred illustrative embodiment, drilling cuttings are mixed with sawdust and transported to a bioremediation site. At the bioremediation site, the mixture of drilling cuttings and sawdust is mixed with paunch waste and then applied to windows designed for vermi-composting.

BRIEF DESCRIPTION OF THE DRAWINGS

FIG. 20 is graphical representation of exemplary data of the hydrocarbon concentration values determined by GC-FID (mg/kg dry weight) over time of the third test of vermicomposting.

DETAILED DESCRIPTION OF THE INVENTION

Figure 1:
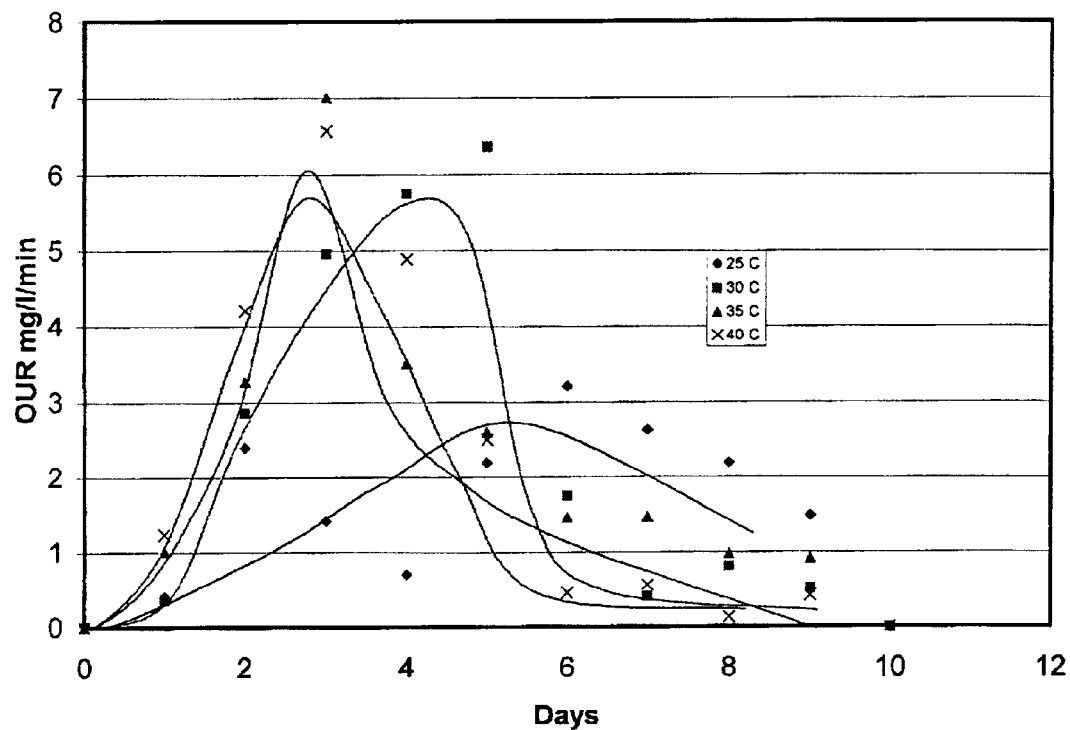
FIG. 1 is a graphical representation of exemplary sample data showing the effect of temperature on biodegradation rate of linear paraffin based drilling fluid on simulated cuttings in a bioreactor.

A new synthetic-based fluid has been developed that minimizes environmental impact and actually provides needed soil nutrients by replacing one or more of these four major components with environmentally friendly materials. This fluid maintains the excellent drilling engineering properties of conventional synthetic-based fluids and oil-based fluids.

The following terms and phrases are used herein and are intended to have the following meaning:

"ES" is Electrical Stability (API RP 13B-2), V;

"GC-FID" is Gas Chromatograph with Flame Ionization Detector,

"HTHP" is High Temperature, High Pressure;

"$IC_{50}$" is Concentration of Test Material at which the rate of bioluminescence of bacteria used in a Microteox test is reduced by 50%;

"LP" is Linear Paraffin;

"OUR" is Oxygen Uptake Rate, mg/L/min;

"OWR" is ratio of [% Oleaginous Fluid]/[% Water], calculated so that the sum of the two phases=100%;

"ROC" is Retained Fluid on dried Cuttings, % w/w, and

"SOC" is Synthetic Fluid on Dried Cuttings, % w/w.

The present invention is directed to a biodegradable, low-toxicity drilling fluid to facilitate (1) drilling a wellbore and (2) bio-remediation of the drill cuttings.

Oleaginous drilling fluids generally contain some components, such as excess lime and clays, which are intrinsically beneficial to many soils. Low pH (<5.5) is detrimental to most agricultural crops, and often soil needs to be treated with an alkaline material like lime to counteract the effects of low pH. Clays can act as soil conditioners, especially for sandy soil, by improving its texture and increasing its water-holding capacity. In addition, some organics, especially those similar to humus, serve as nutrients and conditioners.

The major components of conventional prior art oleaginous drilling fluids, on the other hand, may not be so beneficial. Such components may include (a) oleaginous base fluid; (b) non-oleaginous fluid; (c) emulsifier/surfactant package; and (d) weighting agent. Any one of these may affect seed germination, plant growth and/or the life cycle of native fauna, e.g. earthworms. The present invention overcomes these limitations by formulating an invert emulsion drilling fluid that is suitable for bio-remediation.

The amount of oleaginous base fluid in the drilling fluid of the present invention may vary depending upon the particular oleaginous fluid used, the particular non-oleaginous fluid used, and the particular application in which the drilling fluid is to be employed. However, generally the amount of oleaginous base fluid must be sufficient to form a stable emulsion when utilized as the continuous phase. Typically, the amount of oleaginous base fluid is at least about 30, preferably at least about 40, more preferably at least about 50 percent by volume of the total fluid. The oleaginous base fluid may be any oleaginous base fluid suitable for use in formulating an invert emulsion drilling fluid base fluid, however it is important the oleaginous fluid be compatible with the bio-remediation and biodegradation goals of the present invention. With this proviso in mind, the oleaginous base fluid may include substances such as diesel oil, mineral oil, synthetic oil, saturated and unsaturated paraffins, branched paraffins, ester oils, glycerides of fatty acids, aliphatic esters, aliphatic ethers, aliphatic acetals, or other such hydrocarbons and combinations of these fluids suitable for use in a drilling fluid. However, such a fluid should preferably be substantially composed of paraffin. That is to say the predominant component is preferably paraffin. Especially preferred are linear paraffins, and more preferably linear paraffin having 11 to 18 carbon atoms. One preferred illustrative embodiment of the present invention utilizes a commercially available $C_{11}$–$C_{18}$ linear paraffin material sold under the tradename BIO-BASE 560, available from M-I LLC. of Houston, Tex. Another preferred illustrative embodiment utilizes a commercially available $C_{12}$–$C_{13}$ linear paraffin sold by Sasol.

The amount of non-oleaginous fluid in the drilling fluid of the present invention may vary depending upon the particular fluid used, the particular oleaginous fluid used, and the particular application in which the drilling fluid is to be employed. However, generally the amount of non-oleaginous fluid must be sufficient to form a stable emulsion when utilized as the internal phase, also known as the discontinuous phase, of the drilling fluid. The internal non-oleaginous fluid generally is an aqueous solution containing one or more of the following: a non-electrically conductive material, e.g. an alcohol including glycerin, glycols, polyols; a salt containing a biodegradable anion, preferably formate ion more preferably in the form of sodium formate, or acetate such as calcium magnesium acetate (CMA); a salt containing a soil-nutrient-anion and possibly cation, preferably nitrate ion in the form of calcium nitrate, ammonium calcium nitrate, or phosphate ion preferably potassium pyrophosphate. In one preferred and illustrative embodiment of the present invention, the non-oleaginous fluid is substantially free of halide ion. That is to say, the amount of halide ion is such that the halide content is suitable for bioremediation and biodegrading of the drilling fluid or any resulting cuttings. In one illustrative embodiment, the fluid is formulated such that halide-containing salts typically used in drilling fluid formulation, (e.g. potassium chloride, potassium bromide, and other halide salts) are not used in the formulation of the non-oleaginous phase. This results in a non-oleaginous phase that does not substantially increase the halide salt content of the soil into which the biodegraded drilling fluid or cuttings are applied. Typically the amount of non-oleaginous fluid is less than about 90, preferably less than about 70, more preferably less than about 50 percent by volume of the total fluid.

One illustrative version of the non-oleaginous fluid internal phase is a nitrate brine. Another illustrative version uses acetate brine as the internal phase. A third illustrative version of the internal phase is a blend of the nitrate and acetate brines. A blend of acetate and nitrate salts of one illustrative embodiment was found to be particularly suited for direct land treatment of muddy cuttings, inasmuch as the acetate is intrinsically biodegradable while the nitrate accelerates the overall biodegradation process.

As with the other components of the inventive drilling fluid formulation, the emulsifier package utilized to stabilize the invert emulsion and maintain oil-wetting character of the drilling fluid should be biocompatible and not adversely affect the biorememdiation process. That is to say the emulsifier package used to stabilize the emulsion drilling fluid should be a biodegradable material. Further, the emulsifier should be present in an amount sufficient to stabilize the invert emulsion so that the invert emulsion can be used as a drilling fluid. Especially preferred in one illustrative embodiment is eurisic diglyceride, but other emulsifiers suitable for forming oleaginous drilling fluids may also be used. Thus, in one illustrative embodiment, blends of commercial emulsifiers, such as NOVAMUL and VERSAWET both available from M-I Houston, Tex. with eurisic diglyceride are used to form stable invert emulsion suitable for use as an invert emulsion drilling fluid.

In addition to the oleaginous fluid, non-oleaginous fluid and emulsifier package used in the drilling fluids of the present invention, other components typical of oleaginous drilling fluids, and well known in the art, may be used. For example, in one illustrative embodiment, viscosifying agents, for example, organophilic clays, are employed in the invert drilling fluid compositions utilized as part of the present invention. Other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 3 percent by weight to volume of the total fluid. In one exemplary drilling fluid an organophilic clay is used, preferably an organophilic clay that is a high yield clay and tolerant to high temperatures. Especially preferred in this illustrative embodiment is BENTONE 38 available from M-I Houston, Tex.

Another typical additive to oleaginous drilling fluids that may optionally be included in the oleaginous drilling fluids of the present invention are fluid loss control agents such as modified lignite, polymers, oxidized asphalt and gilsonite. Usually such fluid loss control agents are employed in an amount which is at least about 0.1, preferably at least about 1, more preferably at least about 3 percent by weight to volume of the total fluid. The fluid-loss reducing agent should be tolerant to elevated temperatures, and inert or biodegradable. Especially preferred is ECOTROL available from M-I, Houston, Tex.

The illustrative invert oleaginous fluids used and disclosed as being within the present invention may optionally contain a weighting agent. The quantity and nature of the weight material depends upon the desired density and viscosity of the final composition. In one such illustrative embodiment, the weight materials utilized include, but are not limited to, hematite, barite, ilmenite, calcite, mullite, gallena, manganese oxides, iron oxides, mixtures of these and the like. The weight material is typically added in order to obtain a drilling fluid density of less than about 24, preferably less than about 21, and most preferably less than about 19.5 pounds per gallon. The weighting agent should be inert or innocuous to the conditions of bioremediation especially if the product is to be dissolved by low-pH soil. In one such illustrative embodiment, hematite (FER-OX) or calcium carbonate (SAFE-CARB) are selected as preferred weighting agent. Hematite may provide iron to iron-poor soils. Barite as a weighting agent is less desirable than other weighting agents especially if a formate salt is used in the internal phase. In the presence of formate ion some soluble barium are formed (400 ppm was measured at room temperature). Likewise, some dissolution barite may occur in low-pH environments, such as acid soils, making the use of barite as a weighting agent less desirable than other potential weighting agents.

One skilled in the art may readily identify whether the appropriate ingredients and amounts have been used to form a useful oleaginous drilling fluid by performing the following test:

Oleaginous Slurry Test: A small portion of the formulated slurry is placed in a beaker that contains an oleaginous fluid. If the slurry is an oleaginous, it will disperse in the oleaginous fluid. Visual inspection will determine if it has so dispersed.

Alternatively, the electrical stability of the formulated slurry may be tested using a typical emulsion stability tester.

For this test, the voltage applied across two electrodes is ramped upward, and, if the slurry is an invertemulsion, a surge of current will flow at the voltage where the emulsion breaks. The voltage required to break the emulsion is a common measure of the stability of such an emulsion. One of skill in the art should know and understand that as the breakdown voltage increases, the stability of the invert emulsion increases. Other tests for determining the formation and stability of an invert emulsion drilling fluids are described on page 166 of the book, *Composition and Properties of Drilling and Completion Fluids*, 5th Edition, H. C. H. Darley and George Gray, Gulf Publishing Company, 1988, the contents of which are hereby incorporated by reference.

One illustrative method of bioremediation of the drilling fluids and drilling cuttings generated by using the fluids of the present invention includes the use of a bioreactor. Bioreactor treatment is designed to provide accelerated aerobic or anaerobic biodegradation in a controlled environment, and generally involves slurrification of the biodegradable waste in water or other carrier fluid. In one such illustrative aerobic bioreactor operation, the oleaginous drilling fluid-coated drill cuttings are dispersed in a quantity of water, spiked with a bacterium designed to metabolize hydrocarbons, and the entire slurry aerated continuously with air. The biodegradation rate is determined from measurements of Dissolved Oxygen (DO) and Oxygen Uptake Rate (OUR).

The biodegradation process exhibits an induction period as the bacteria population increases. This is manifested in the rapid increase of the Oxygen Uptake Rate. In one illustrative example, simulated drill cuttings coated with a lab-prepared oleaginous slurry prescribed by this invention were treated in an aerobic bioreator at room temperature (e.g. 25° C.) using no additional nutrient and only moderate aeration. When the fuel (fluid on the cuttings) depleted to a synthetic oil fluid on cuttings (ROC) of about 3% w/w (after about 7 days), the rate of biodegradation peaked and began to fall rapidly. By 15 days, ROC had fallen to <1% w/w, and the rate had reached a plateau beyond which little reduction in ROC is observed. By contrast, cuttings coated with a conventional diesel-based mud with $CaCl_2$ brine internal phase exhibits a ROC of about 7% w/w even after 21 days.

Temperature is an important factor in optimizing the bioreactor process. Indeed, increasing the temperature by about 10° C. (to 35° C.) cuts the time required for OUR to drop to near-baseline levels (and ROC<1% w/w) as shown in the graphical representation of the exemplary data given in FIG. 1. Increasing the temperature beyond 35° C. results in little gain for most bacteria, and above 40° C., hydrocarbon-metabolizing bacteria generally begin to lose activity.

As important as the operating temperature is, efficient transport of oxygen and the presence of other nutrients are equally important to efficient operation of a bioreactor. Modifying the flow of air to ensure higher and more homogeneous values of Dissolved Oxygen increases the biodegradation rate. Similarly, comminution of the cuttings and/or introducing mechanical mixing can enhance the rate. Various nutrients, especially nitrate, can also play a role in the degradation process. Spiking the mixture with a general-purpose fertilizer (containing potassium and phosphate along with nitrate) produces enhanced biodegradation rates, and maintaining a high fertilizer content produces higher sustained biodegradation rates.

Another illustrative method of bio-remediation of the drilling fluid solids and cuttings generated by using the fluids of the present invention is conventional composting. During conventional composting, heat generated by microbial decomposition is retained within a pile or compost vessel, and degradation of the material occurs in a number of distinct phases according to the dominant types of bacteria at any given time. The pile/vessel is initially colonized by mesophilic organisms that grow best at ambient temperatures, but as the material degrades and heat builds up in the pile/vessel (usually rising to 50° C. within two to three days), they are superseded by thermophilic organisms that thrive at high temperatures (50–60° C.). These higher temperatures are more favorable for rapid biodegradation and are used in some composts to kill potentially harmful pathogens in a process similar to pasteurization. As only thermo-tolerant organisms can survive at the higher temperatures, the microbial numbers start to decline, and the composting material cools. At this stage anaerobic conditions may develop, unless sufficient air is introduced. In the third stage, the material continues to cool and the microorganisms compete for the remaining organic material, leading to a breakdown of cellulose and lignins etc. During the final, maturation stage, levels of microbial activity continue to decline as the remaining food is used up and the microorganisms die off.

Whereas bioreactor treatment is generally a fluid process (slurrification of solid or liquid biodegradable material), conventional composting primarily involves solids. Windrowing (mechanical or manual turning of the material) and forced aeration of static biopiles are the commonest methods, although there are also methods of mixing and aerating the material based on rotating reactors. The rotary composting vessel has a small footprint and can be used to continuously process the cuttings waste stream. The mixing imparted by the gradual rotation of the drum (0.5 rpm) is enough to ensure adequate aeration of the composting mixture. Use of an insulated drum improves heat retention of the composting mixture and increases the rate of degradation. Oil-coated drill cuttings may be mixed together with another solid organic substance that is also reasonably readily degraded, e.g. straw or wood chips. This mixture may be supplemented with nitrogen, phosphorous and possibly other organic nutrients.

The present invention is also directed to a method of bio-remediation of drill cuttings using vermiculture, also called worm culture or vermicomposting. In particular, the present illustrative embodiment provides a high efficiency process for the biodegradation of drill cuttings using vermiculture and vermicomposting beds. Vermiculture can provide worms as a raw material for an animal feed ingredient, live worms for sport fishing, or for other product uses. Vermicomposting is the use of worms to break down waste materials such as livestock manure and municipal waste. Generally, worms consume inorganic and organic matter, digest and absorb largely organic matter, and pass the remainder back to the soil. As a result of their feeding behavior, worms aid in the breaking down of organic material within the material they consume. The activity of worms also ventilates the soil and promotes bacterial and other microbial decomposition processes.

Large-scale vermiculture typically uses beds in which large quantities of organic material are worked by worms in a relatively stationary mode. The vermicomposting beds also called windows are tended to and the materials are provided in a batch process. Turning or "freshening" of the beds by introduction of bedding materials is carried out using specialized vermiculture farm machines well known to one of skill in the art. After the organic material is substantially broken down, the worms and digested material are separated and harvested.

The term "vermicomposting" as used here is understood to be the breakdown of organic matter by the ingestion and digestion of the matter by worms. Vermicomposting also includes the collateral biotransformation of such organic matter from the bacterial action inherent in such systems. As such the present invention is also an apparatus and process for worm production by exposing the worms to the compositions of the present invention. There is believed to be at least hundreds of species of what are commonly known as "red" worms in the vermicomposting technology. One example is the Lumbricus rubellus another is Esenia foetida. Generally, the species of red worm is not important to vermicomposting and while the red worms used to demonstrate the present invention were Esenia foetida, other types will work equally, depending somewhat upon the type of organic matter and environment. That is to say that other species of earthworm may be used in addition or instead of "red" worms such as Esenia foetida. As the term is used in the present description, "worm" is intended to include all types and specie of earthworm that can be utilized in the vermi-composting of organic materials.

Methods of vermicomposting and vermiculture should be well known to one of ordinary skill in the art. For example, U.S. Pat. Nos. 2,867,005; 3,635,816; 4,262,633; 4,187,940; 5,451,523; 6,223,687; 6,654,903 all describe differing methods of vermicomposting and vermiculture. The contents of each of these patents are hereby incorporated herein by reference.

In the practice of the present illustrative embodiment, drill cuttings are blended with a bulking agent to facilitate transport to the treatment site. Examples of such bulking agent include: sawdust, wood shavings, rice hulls, canola husks, shredded newsprint/paper; shredded coconut hulls, cotton seed hulls, mixtures of these and other similar materials. The cuttings and bulking agent are preferably blended with a compostable waste material prior to further treatment at the treatment site. Examples of suitable compostable waste include yard or household wastes, food preparation or processing wastes, paunch or rumen material or similar animal rendering wastes, sewage sludge from a water treatment facility and mixtures of these and other similar materials. The mixing process is carried out so as to give the optimum carbon:nitrogen:moisture balance prior to spreading. Because the bio-remediation of the mixture is an aerobic process, the optimum conditions for worm driven waste management of these materials is 75% (w/w) moisture, with a carbon nitrogen ratio of 25:1.

The mixture of drill cuttings and nitrogenous materials is then vermicomposted. Preferably this is carried out by spreading the mixture onto windrows or specialized/mechanical worm beds where the worms ingest the material further degrading the cuttings and excreting the resulting worm cast which is collected and subsequently used as a fertilizer or soil conditioner.

An optional intermediate stage carried out prior to spreading is to pre-compost the cuttings mixture. Such pre-vermiculture pre-composting is carried out in a traditional manner of composting organic materials. Such pre-composting treatment may be desired for a number of reasons including: a) increase the rate of remediation by the action of thermolytic micro-organisms and enzymes which make the organic material more available to the degrading organisms; b) reduce the number of pathogenic micro-organisms present in any of the other components of the mixture; c) to reduce the risk of overheating (within the worm beds) through microbial action and thus reduce the activity of the worms.

The methods of the present illustrative embodiment may be equally applied to the treatment of either water-based or oil-based drilling fluids. Such fluids may typically contain olefin, esters, acetals, glycol, starch, cellulose, fish and vegetable oils and mixtures of these and other organic materials that require treatment prior to disposal. It is important to note that the selection of such materials should preferably be limited to materials that are not excessively saline or toxic to the worms. Treatment of such oilfield wastes containing hydrocarbons or any other suitable organic components using the methods of the present invention may be enhanced by a pre- or co-composting stage as previously described.

It may also be possible to effect the scavenging of heavy metals from soils and oilfield wastes based upon the worm's ability to bioaccumulate heavy metals. Preferably this operation would be carried out prior to disposal and would work in a similar manner to phytoremediation.

Use of alternative organisms and species, e.g. nematodes or other worm types is also contemplated and is considered with the scope of the present invention. Such alternative organisms include genetically modified worms with either enzymes for degradation of problem pollutants or worms containing genetically modified bacteria able to degrade problem pollutants at higher rates. Marine vermiculture utilizing organisms able to work at much higher salt concentration and degrade marine pollutants is also contemplated as being within the scope of the present invention.

The following examples are included to demonstrate illustrative embodiments of the invention. It should be appreciated by those of skill in the art that the compositions, formulations, and techniques disclosed in the examples which follow represent techniques discovered by the inventors to function well in the practice of and thus are illustrative of the present invention. As such the following examples can be considered to be illustrative of the present invention and constitute preferred illustrative modes for its practice. However, those of skill in the art should, in light of the present disclosure, appreciate that many changes can be made in the illustrative embodiments which are disclosed and still obtain a like or similar result without departing from the scope of the invention.

All values associated with the formulations described below are grams unless otherwise specified.

EXAMPLE 1

The following illustrative embodiment of the present invention demonstrates a method of preparing the oleaginous drilling fluid, a suitable test procedure for operation and monitoring of a lab-scale bioreactor, and biodegradability test results of oleaginous base fluids.

Drilling Fluid Mixing & Testing Procedure

Test fluids were mixed with a Hamilton Beach (HB) mixer over a period of 1 hr, and then exposed to high shear with a Silverson mixer set at 7000 rpm until the slurry reached 150° F. Property measurements consisted of initial API Electrical Stability (ES) and API standard rheology at 150° F. After heat-aging (rolling) the fluids for 16 hr at 250° F., ES, rheology (again at 150° F.) and API standard HTHP fluid loss at 250° F. were measured. The fluid density was approximately 13.0 lb/gal, OWR=70/30, and the water activity of the internal water phase=0.86 to 0.76 (equivalent to 18 to 24% $CaCl_2$).

More rigorous testing included prolonged stability at 300° F. and resistance to the following contaminants: drilled solids (35 lb/bbl OCMA Clay), seawater (10% v/v) and weighting agent (increase of density from 13 to 15 lb/gal). For these tests the base fluid was mixed in small amounts over a period of 1 hr on the Silverson at 7000 rpm, maintaining the temperature at or below 150° F. To three of the portions of base fluid, one of the contaminants was added and mixed in with the HB mixer for 10 min. As before, initial ES and rheology measurements were followed by heat-aging at 250° F. for 16 hr, then ES and rheology (at 150° F.) and HTHP fluid loss at 250° F. on half of a lab bbl. The other half of a lab bbl of each sample was heat-aged at 300° F. for an additional 16 hr, and again ES, rheology (at 150° F.) and HTHP fluid loss (at 300° F.) were determined.

Bioreactor Test Procedure

The bioreactor treatment is designed to provide accelerated aerobic biodegradation in a controlled environment, and generally involves slurrification of the biodegradable waste. Simulated soil is mixed with the drilling fluid to produce muddy "cuttings", dispersed in a quantity of water, spiked with a bacterium designed to metabolize hydrocarbons, and the entire slurry aerated continuously with air. The biodegradation rate is determined from measurements of Dissolved Oxygen (DO) and Oxygen Uptake Rate (OUR). The experimental procedure is as follows:

Formulate 4.5 kg of simulated cuttings consisting of ⅓ Texas bentonite, ⅓ Rev Dust and ⅓ Blast Sand #5 (70–140 mesh).

Spike the cuttings with 1125 mL (1755 g) of mud.

Add 10 L of aged tap water into the bioreactor, an inverted 5-gal water bottle with the bottom cut out.

Add 10 g of bacteria/L (~150 g).

Slurry 900 g spiked soil with 10 L de-chlorinated tap water initially, add 900 g on day 2 and 1800 g on day 4 for a total concentration of about 3600 g/15 L or about 240 g/L (18% solids w/w or 34% w/v).

Provide vigorous aeration with aeration device that can provide up to 60 L/min of air.

Conduct standard API retort analysis of cuttings to determine oil content on solids at beginning and end of test.

Conduct solvent extraction to determine oil content at the beginning and end of the test for comparison with retort analysis.

Determine OUR approximately once a day from measurements of Dissolved Oxygen, using a Dissolve Oxygen meter.

Once a week check pH and maintain in 6–9 range.

Periodically check nitrogen, along with other potential nutrients.

Continue running the retort until OUR drops to a negligible level.

All values associated with the formulations described below are grams unless otherwise specified.

Environmental tests were carried out on the base fluids, several muds, and a few samples of mud-coated cuttings before and after treatment in a bioreactor. The tests consisted of the following: (a) biodegradability (respiration rate and hydrocarbon loss in a reference moist soil); (b) phytotoxicity (alfalfa seed emergence and root elongation); (c) earthworm survival; (d) springtail survival; and (e) Microtox (IC-50 on bioluminescent bacterium *Photobacterium phosporeum*).

Base Fluid Biodegradability Tests:

Tables 1 and 2 indicate the relative biodegradability and toxicity of various Base Fluids.

TABLE 1

Biodegradability of Various Base Fluids

| Treatment | % Reduction of Hydrocarbons | Biodegradability Rank |
|---|---|---|
| $C_{11-14}$ LP | 97 | 1 |
| $C_{12-17}$ LP | 94 | 2 |
| Ester | 91 | 3 |
| Isomerized tetradecene $C_{14}$ (IO) | 83 | 4 |
| Diesel | 61 | 5 |
| Branched Paraffin | 43 | 6 |

TABLE 2

Toxicity of Various Base Fluids*

| Treatment | Water Toxicity Microtox $IC_{50}$ | Animal Toxicity % Earthworm Survival | Alfalfa Phytotoxicity | | Toxicity Rank |
|---|---|---|---|---|---|
| | | | % Seed Emergence | % Root Elongation | |
| Branched Paraffin | 106 | 100 | 95 | 107 | 1 |
| $C_{11-14}$ LP | 98.5 | 100 | 96 | 134 | 2 |
| $C_{12-17}$ LP | 65.9 | 100 | 95 | 120 | 3 |
| Isomerized tetradecene $C_{14}$ (IO) | 61.7 | 100 | 101 | 144 | 4 |
| Diesel | 10.3 | 0 | 7 | 2 | 5 |
| Ester | 5.9 | 0 | 0 | 0 | 6 |

*Seed Emergence and Root Elongation test results are normalized to Control test values of 100.

One of skill in the art will appreciate that the results of Table 1 indicate that diesel and the branched paraffins are more resistant to rapid biodegradation than the other four fluids. The toxicity data in Table 2 shows that the diesel, and unexpectedly the ester, are considerably more toxic than the branched paraffin, linear paraffins (LP's) or isomerized tetradecene internal olefin (IO) in all five tests. The Microtox test also showed some differentiation between the $C_{12-17}$ LP and IO (higher toxicity) and $C_{11-14}$ LP and branched paraffin (lower toxicity). This may occur inasmuch as higher molecular weight branched fluids tend to exhibit lower acute toxicity in tests that focus on water-column toxicity.

The toxicity of the ester may be explained by its biodegradation behavior. GC-FID analysis of soil extracts from all six fluids shows that only the ester produces non-volatile intermediate degradation products, including toxic materials like hexanol, 2-ethyl hexanol, 2-ethyl hexanoic acid and 2-ethylhexyl 2-ethylhexanoate. These intermediate products constituted about 30% of the ester lost through biodegradation.

EXAMPLE 2

The following illustrative embodiment of the present invention demonstrates that the oleaginous drilling fluids of the present invention are useful as drilling fluids.

Standard fluid properties of three 13 lb/gal, 70/30 SWR (Synthetic/Water Ratio) formulations, one with an acetate brine (Formulation A), one with a nitrate brine (Formulation N) and the other a nitrate/acetate blended brine (Formulation NA) are shown in Table 3. A conventional high-performance diesel-based mud with $CaCl_2$ brine internal phase gives standard properties that are very similar. The three formulations in Table 3 were also hot-rolled for 16 hr at 300° F., as well as 250° F. with essentially no degradation in rheology or electrical stability (ES).

Biodegradability and toxicity of Formulations A and N are contrasted with those of typical diesel/$CaCl_2$/barite fluid in Table 4. The leading rate on the test soil in Table 4 was 6% w/w. These results show that fluids A and N both are consistently more biodegradable and much less toxic than the diesel mud. In comparing formulation A with a similar formulation weighted with barite (instead of hematite), biodegradability and toxicity appear to be similar for the two fluids. However, a soil-enhancing iron source is considered desirable for its long-term potential benefits.

Except for the Springtail survival data, Formulation A showed consistently lower toxicity than Formulation N. This trend appears to correlate with the trend in electrical conductivity (EC) measured after the biodegradation test, i.e. after 65 days. Thus, a fluid with a higher EC may generally give a higher toxicity, i.e. toxicity increases with increasing ionic strength. That Formulation A gives such a low EC is thought to be the result of relatively rapid biodegradation of the acetate ion.

The toxicity data for the fluid formulation in Table 4 indicate that the % Root Elongation observed for Formulation A is nearly 50% greater than or the control. This suggests that Formulation A may serve to enhance some aspects of the quality of the soil.

TABLE 3

Standard Properties of two Paraffin-Based Fluids

| Component (g) | Formulation A | Formulation NA | Formulation N |
|---|---|---|---|
| BIO-BASE 560 | 144 | 143.7 | 143.5 |
| BENTONE 38 | 5.0 | 5.0 | 5.0 |
| Lime | 3.0 | 3.0 | 3.0 |
| ECOTROL | 5.0 | 5.0 | 5.0 |
| NOVAMUL | 8.0 | 8.0 | 8.0 |
| VERSAWET | 2.0 | 2.0 | 2.0 |
| CMA Brine | 97.0 | — | — |
| 50/50 Brine Blend at 1.27 SG (28% by wt CMA and 50% by wt ENVIROFLOC) | — | 115.1 | — |
| ENVIROFLOC Brine (40% by wt at 1.20 SG) | — | — | 112.9 |
| FER-OX | 283 | 267.1 | 263.9 |

| Rheology at 150° F. | Initial | Hot Rolled* | Initial | Hot Rolled* | Initial | Hot-Rolled* |
|---|---|---|---|---|---|---|
| 600 rpm | 55 | 50 | 61 | 51 | 52 | 42 |
| 300 rpm | 31 | 28 | 39 | 30 | 30 | 23 |
| 200 rpm | 24 | 22 | 31 | 22 | 21 | 15 |
| 100 rpm | 15 | 14 | 21 | 14 | 15 | 10 |
| 6 rpm | 6 | 5 | 9 | 5 | 6 | 4 |
| 3 rpm | 5 | 4 | 8 | 4 | 5 | 3 |

TABLE 3-continued

Standard Properties of two Paraffin-Based Fluids

| PV, cp | 24 | 22 | 22 | 21 | 22 | 19 |
|---|---|---|---|---|---|---|
| YP, lb/100 ft$^2$ | 7 | 6 | 17 | 9 | 8 | 4 |
| 10-Second Gel | 6 | 6 | 8 | 6 | 6 | 5 |
| 10-Minute Gel | 9 | 7 | 10 | 6 | 6 | 5 |
| Electrical Stability, Volts | 171 | 199 | 320 | 263 | 314 | 242 |
| Internal Phase Water Activity | 0.86 | | 0.76 | | 0.77 | |
| HTHP Filtrate at 250° F., mL | — | 1.8 est. | — | 2.0 | — | 0.8 |
| Filtrate Water, mL | | Trace | | Nil | | Nil |

*Hot-Rolled for 16 hr at 250° F.

One of skill in the art will appreciate that the fluids above may be useful in drilling a wellbore.

EXAMPLE 3

The following illustrative embodiment of the present invention demonstrates the use of a bioreactor for the bioremediation of drilling cuttings.

Figure 2:
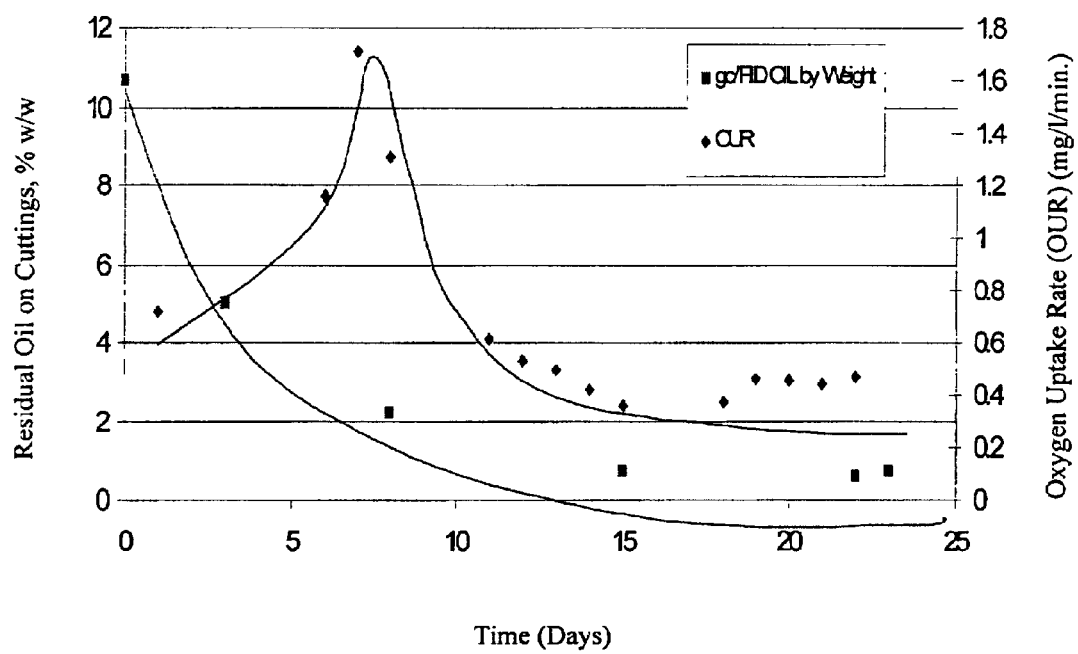
FIG. 2 is a graphical representation of exemplary sample data showing the effect of time on oxygen uptake rate (OUR) and % oil and/or synthetic drilling fluid on cuttings (ROC) of an linear paraffin based drilling fluid on simulated cuttings in a bioreactor at 25° C.

Simulated drill cuttings thoroughly coated with Formulation N were slurrified and treated in the lab bioreactor at room temperature (25° C.). No nutrients were added and only moderate aeration was used. The level of retained fluid on cuttings (ROC) was initially about 11% w/w. A graphical representation of the exemplary results is shown in FIG. 2. Ecotoxicity data, with a loading rate on the test soil of 6% w/w are shown in Table 4

TABLE 4

Biodegradability, Toxicity & Electrical Conductivity of Formulations and Treated Cuttings
6% w/w Loading on Topsoil from Southern Alberta Grassland

| System | Biodegradability (65 days) % Loss of Extractable Hydrocarbons | Animal Toxicity | | Alfalfa Phytoxicty* | | | Relative Electrical Conductivity (after 65 days) |
|---|---|---|---|---|---|---|---|
| | | % Springtail Survival | % Earthworm Survival | % Seed Emergence | % Root Elongation | % Shoot Mass | |
| Formulation A | 98 | 80 | 100 | 100 | 149 | 97 | 1.0 |
| Formulation N | 98 | 87 | 93 | 4 | 11 | 47 | 4.0 |
| Std. Diesel/ CaCl$_2$/ Barite Formulation | 68 | 0 | 0 | 3 | 8 | 25 | 4.9 |

TABLE 4-continued

Biodegradability, Toxicity & Electrical Conductivity of Formulations and Treated Cuttings
6% w/w Loading on Topsoil from Southern Alberta Grassland

| System | Biodegradability (65 days) % Loss of Extractable Hydrocarbons | Animal Toxicity | | Alfalfa Phytoxicty* | | | Relative Electrical Conductivity (after 65 days) |
|---|---|---|---|---|---|---|---|
| | | % Springtail Survival | % Earthworm Survival | % Seed Emergence | % Root Elongation | % Shoot Mass | |
| Formulation A with Barite | 99 | 90 | 100 | 100 | 108 | 105 | 0.8 |
| Bioreactor-Treated Cuttings, Form. NA | — | 93 | 100 | 109 | 134 | 129 | — |
| Bioreactor-Treated Cuttings, Form. N | — | 73 | 100 | 113 | 116 | 121 | 3.9 |

*Phytoxicty test results are normalized to Control test values of 100.

One skilled in the art may appreciate that the biodegradation process exhibits an induction period as the bacteria population increases. This may be manifested in the rapid increase of the Oxygen Uptake Rate (OUR). When the fuel (mud on the cuttings) depletes to an ROC of about 3% w/w (after about 7 days), the rate of biodegradation peaks and begins to fall rapidly. By 15 days, ROC has fallen to <1% w/w, and the rate has reached a plateau beyond which little reduction in ROC is observed. By contrast, a conventional diesel-based mud with $CaCl_2$ brine internal phase exhibited a ROC of about 7% w/w even after 21 days. The phytotoxicity results indicate that both sets of cuttings, when pre-treated in the bioreactor, may promote germination and growth of alfalfa seeds. Bioreactor-treating cuttings appear to enhance the quality of the soil.

initial loading of about 6% base fluid (ROC) by dry weight of cuttings. The 6-day long tests were run in triplicate with 20 seedlings each, using 100% soil as a control and three ratios of % Soil/% Cuttings: 95/5, 75/25 and 50/50. Seedling survival rates (% Viability) and growth rates (% Length) are reported relative to the cuttings-free soil sample in Table 5. The statistical t-test probability figures assume a two-tail distribution of the data; numbers less than about 0.05 are considered significant. The results indicate that there is little or no effect of the cuttings on the health of the alfalfa seedlings until the % Soil/% Cuttings ratio reaches 50/50. Slight reductions in survival and growth rates for the cuttings-loaded soil samples, though not highly significant (statistically), may be related to change in the soil texture, a condition which could be improved by addition of sand and peat.

TABLE 5

Untreated Field Cuttings from New Zealand Field Trial with Formulation N (with Barite)

| | | % Soil: % Cuttings | | | | | |
|---|---|---|---|---|---|---|---|
| | | 95:5 | | 75:25 | | 50:50 | |
| | Control | Untreated | Treated | Untreated | Treated | Untreated | Treated |
| Avg. Viability (%) | 100 | 94 | 98 | 100 | 94 | 88 | 86 |
| Avg. Plant Length (%) | 100 | 109 | 96 | 88 | 91 | 40 | 91 |
| Probability that Deviation from Control due to Chance | 1.0 | 0.62 | .23 | 0.19 | .08 | 0.00005 | .08 |

EXAMPLE 4

The following illustrative embodiment of the present invention demonstrates the use of a bioreactor for the bioremediation of drill cuttings from the field.

In a field trial, a $C_{12-13}$ LP-based drilling fluid was used to drill three intervals (16" to 8-½") of a well in record time. The fluid had OWR of 75/25 and was weighted up to 16 lb/gal with barite. To determine the suitability of direct land treatment of the drilled cuttings, a batch of the mud-laden cuttings from the shale shaker was subjected to alfalfa seed germination tests. The cuttings were determined to have an Alfalfa seed germination tests were conducted on the bioreactor-treated field cuttings. As shown in Table 5, pre-treatment of the cuttings in the bioreactor did not significantly affect the viability or growth rate in the 95/5 and 75/25 tests, but it significantly improved the growth rate of the seedlings for the problematic 50/50 case. Thus, up to a loading of at least 75/25, pre-treatment of the cuttings is probably not necessary, whereas higher loadings may require the kind of pretreatment afforded by a bioreactor.

EXAMPLE 5

The following illustrative example of the present invention demonstrates the use of conventional thermal composting processes in the bioremediation of drilling cuttings.

Figure 3:
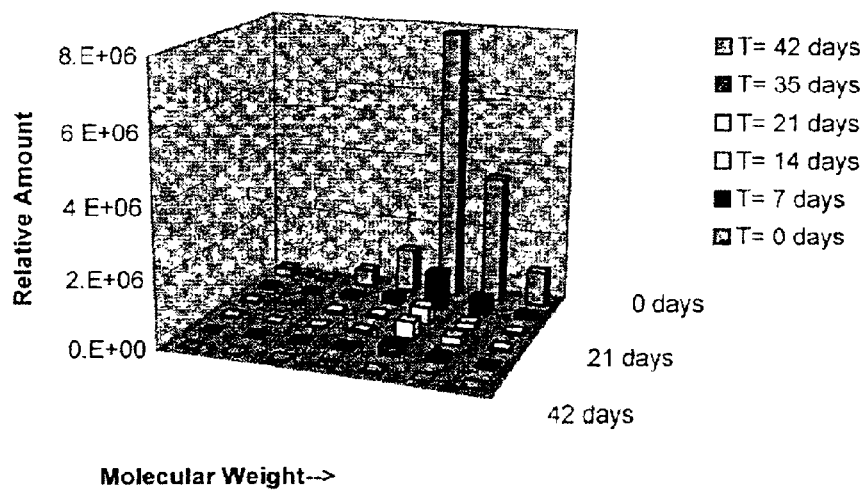
FIG. 3 is graphical representation of exemplary sample data showing chromatographic analysis of hydrocarbon content of cuttings in a composting trial over a period of 42 days in which the seven groups correspond to the seven linear paraffins used in the base fluid.

Muddy drilled cuttings are mixed together with another solid organic substance that is also reasonably readily degraded, e.g. straw or wood chips. This mixture is supplemented with nitrogen, phosphorous and other organic nutrients. Drill cuttings (Oxford Shale 5–10 mm diameter) were coated with 10% w/w drilling fluid (Formulation N), 40% moisture content, and a carbon to nitrogen ratio of approximately 30:1. Naturally-occurring bacteria were used for these tests. Graphical representations of exemplary results are shown in FIG. 3. One of skill in the art will appreciate that the results show reduction in the hydrocarbon content of the composted cuttings over a period of 42 days and show signs of the life cycle described earlier.

Vermi-composting: The fluids of the following illustrative and exemplary embodiments generate drill cuttings that were tested for biodegradation using vermi-composting. The drilling fluids of the present invention were evaluated for their technical performance and thoroughly tested for drilling performance prior to environmental testing which included the following tests:

Alfalfa seed emergence and root elongation.
Earthworms (*Esenia fetida*) toxicity
Springtail (*Folsomia candida*) toxicity.
Microtox toxicity
Biodegradability (Respiration rate and hydrocarbon loss in moist soil.)

The primary selection factor for the drilling fluid was enhancement of production from tight gas sands, an additional criteria being the increased shale inhibition available from the use of synthetic fluids when compared to water-based fluids. This reduces the risk of well bore stability problems that had been experienced in previous wells. Additional benefits include increased rates of penetration and the provision of fluid stability for high-pressure formations and subsequent high-weight requirements.

EXAMPLE 6

The following illustrative example demonstrates the utility of the drilling fluids of the present invention in drilling subterranean wells. A synthetic-based drilling fluid used employed a linear paraffin as the base fluid, calcium ammonium nitrate brine as the internal phase, eurisic diglyceride as the emulsifier and barite as the weighting material. The fluid formulation is provided below in Table 6 in which the amounts are given in pounds per barrel (ppb).

TABLE 6

| Fluid Formulation | | A | B |
|---|---|---|---|
| Base Oil | Sasol $C_{12}$–$C_{13}$ paraffin, ppb | 160.17 | 158.99 |
| Primary Emulsifier | Novamul, ppb | 8.00 | 8.00 |
| Wetting Agent | Versawet, ppb | 2.00 | 2.00 |
| Fluid Loss Additive | Novatec F, ppb | 1.00 | 1.00 |
| Rheology Modifier | Versamod, ppb | 1.00 | 2.00 |
| Organophillic Clay | VG-Plus, ppb | 6.00 | 8.00 |
| Alkalinity Control | Lime, ppb | 6.00 | 6.00 |
| Water | Water, ppb | 47.77 | 47.42 |
| Other | $NH_4Ca(NO_3)_3$, ppb | 32.30 | 31.96 |
| Weight Material | M-I Bar, ppb | 239.87 | 238.63 |

In the above formulation:

Sasol $C_{12}$–$C_{13}$ paraffin is a mixture of linear $C_{12\text{-}13}$ parafin available commercially from Sasol.

NOVAMUL is a emulsifing agent used with the NOVA PLUS system available commercially from M-I LLC of Houston Tex.

VERSAWET is a wetting agent available commercially from M-I LLC of Houston Tex.

VERSAMOD is a LSRV agent available commercially from M-I LLC of Houston Tex.

NOVATECH F is a fluid loss control agent available commercially from M-I LLC of Houston Tex.

VG-Plus is an organophilic clay viscosifying agent available commercially from M-I LLC of Houston, Tex.

MI Bar is a barite based weighting agent available commercially from M-I LLC of Houston, Tex.

Lime is commercially acceptable grade of calcium hydroxide commonly available.

Calcium Ammonium Nitrate is a commercially acceptable grade commonly a available.

The technical performance of the new fluid system was assessed in the laboratory prior to use in the field. These tests were conducted substantially in accordance with the procedures in API Bulletin RP 13B-2, 1990 which is incorporated herein by reference. The following abbreviations may be used in describing the results of experimentation:

"E.S." is electrical stability of the emulsion as measured by the test described in *Composition and Properties of Drilling and Completion Fluids*, 5th Edition, H. C. H. Darley, George R. Gray, Gulf Publishing Company, 1988, pp. 116, the contents of which are hereby incorporated by reference. Generally, the higher the number, the more stable the emulsion.

"PV" is plastic viscosity that is one variable used in the calculation of viscosity characteristics of a drilling fluid, measured in centipoise (cP) units.

"YP" is yield point that is another variable used in the calculation of viscosity characteristics of drilling fluids, measured in pounds per 100 square feet (lb/100 ft$^2$).

"AV" is apparent viscosity that is another variable used in the calculation of viscosity characteristic of drilling fluid, measured in centipoise (cP) units.

"GELS" is a measure of the suspending characteristics, or the thixotropic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss at 200° F., measured in milliliters (ml) according to API bulletin RP 13 B-2, 1990.

The initial properties of the fluid were measured and then the fluid was aged at 250° F. for 16 hours with rolling. The rheology of the initial fluid and the aged fluid were measured at 120° F. Representative data is given below in Table 7:

TABLE 7

| | Fluid A | | Fluid B | |
|---|---|---|---|---|
| Fluid Properties | Initial | Aged | Initial | Aged |
| Mud Weight (SG) | 1.44 | 1.44 | 1.44 | 1.44 |
| 600 rpm Rheology | 44 | 41 | 55 | 54 |
| 300 rpm Rheology | 29 | 26 | 35 | 33 |
| 200 rpm Rheology | 19 | 19 | 27 | 25 |
| 100 rpm Rheology | 14 | 12 | 19 | 16 |
| 6 rpm Rheology | 6 | 5 | 10 | 7 |
| 3 rpm Rheology | 6 | 5 | 9 | 7 |
| PV., cP | 15 | 15 | 20 | 21 |
| YP, lb/100 Ft$^2$ | 14 | 11 | 15 | 12 |
| 10 s. Gel, lb/100 ft$^2$ | 8 | 7 | 14 | 11 |
| 10 min, Gel, lb/100 t$^2$ | 11 | 11 | 19 | 20 |
| HTHP @ 250° F., cc/30 | 2.4 | 2.0 | 2.8 | 2.4 |
| ES @ 120° F., Volts | 658 | 210 | 795 | 422 |

Upon review of the above data, one of ordinary skill in the art should appreciate that the above formulated fluid is useful as an oleaginous drilling fluid.

The fluid was introduced in a field where high weight water-based muds from 16–19 lb/gal were traditionally used at depths from around 1000 m with hole problems experienced, including but not limited to: extremely reactive plasticene clays, squeezing up the inside of the casing; formation of "mud rings"; significant borehole ballooning; high background gas and gas kicks; numerous hole packoffs due to tectonics, e.g. 3–4-in. pieces of wellbore popping off into the annulus; minimal hole tolerance to formation pressure balance, i.e. a fine line between gains and losses; fluid rheology problems at high weights; induced fractures due to ECD's; water flows; no logs successfully run; difficulty in running casing; and/or resultant fluid cost contributed to 30% of the AFE Total well budget.

Eleven wells had been drilled in the area with water-based mud and all experienced extensive hole problems. Alternative systems were considered and the newly engineered "bioremediation friendly" drilling fluid of the present invention was chosen based on the selection criteria discussed previously.

Well 1 was drilled using a prior art silicate-based system and resulted in three stuck pipe incidents, two sidetracks, significant torque and overpull, ballooning from plastic clays, numerous packoffs, high rheologies due to excessive MBTs, and difficult wiper trips. The well never reached total depth and had to be plugged and abandoned due to poor hole conditions. It took 28 days to drill to 1150 m.

Well 2 was drilled with a drilling fluid formulated according to the teachings of the present invention as noted above. The results surpassed reasonable expectations of performance by one of skill in the art. A depth of 2544 m was achieved in only 34 days. No drilling problems were experienced and torque and drag was reduced. The hole was successfully logged with the caliper indicating gauge hole, and hole integrity was maintained during a five-day, openhole testing program. This had not been achieved in previous wells and was unexpected and surprising.

Additional wells have since been drilled in this area using the same fluid and with minimal hole problems and cheaper overall drilling fluid costs compared to the previous water-based muds wells. The paleontology results are the best the operator has seen and all holes have reached total depth with efficient casing runs and logging. Hole conditions are still difficult but the combination of experience; good drilling practice and the "bioremediation friendly" synthetic mud system has contributed to a successful ongoing drilling program. Skin irritation levels are very low by comparison with other synthetic and oil-based systems that have been used in other countries. However, strict adherence to a good occupational hygiene program including barrier cream, nitrile gloves and disposable coveralls greatly reduces the chances of irritations. The resulting drill cuttings were mixed with sawdust and/or wood shavings (45% w/w) at the rig site to facilitate transport and then delivered for bioremediation.

EXAMPLE 7

The present illustrative example demonstrates the utility of using the drilling fluids of the present invention in drilling subterranean wells. An advantage of this illustrative example was the fact that the fluid was used in an 8½-in. sidetrack of a wellbore, originally drilled with a potassium chloride/Glycol water-based mud, thus permitting direct comparison of conditions and performance.

According to prior field practice, drilling fluid weights for wells in this area are 9.2–11 pounds/gallon (lb/gal.) using highly inhibitive water-based muds. Although hole problems were generally less in this area compared to the area drilled in the Example A, there were still significant challenges that were difficult to overcome using the prior practice including: highly reactive, tectonically stressed shale bands, causing excessive cavings; interbedded clays dispersing into the system and creating concerns with rheology; slow rate of penetration through the lower section of the hole; considerable borehole breakout due to openhole exposure time; seepage losses to limestone; coal stringers; excessive trip times due to reaming and back reaming of open hole sectioning.

Using a prior art water-based drilling mud, an 8½-in. hole was drilled in 47 days using a water-based mud, including a four-day fishing run, with a section length of 3005 m. Average rate of penetration through the lower section of the hole was 2–4 m/hr. Hole washout was extensive and difficult trips were experienced. The logs could not be run to the bottom. The high MBT of the system required increased dilution requirements.

After plugging back the well and displacing to the fluids of the present invention, the hole was drilled ahead. A synthetic-based drilling fluid was used and employed a linear paraffin as the base fluid, calcium ammonium nitrate brine as the internal phase, and barite as the weighting material. The fluid formulation is provided in the previous example.

Drilling was fast and 22 days into drilling, the depth was greater than that of the original well, reducing 26 days off the previous time curve. By day 25, the well had reached a depth of 4800 m with no hole problems experienced, minimal overpull and drag, and no logging or tripping incidents. The logs revealed an in-gauge hole. The drilling mud formulation and fluid system was stable. The cuttings were collected in a direct collection bin at the base of the auger outlet and transferred to a truck after blending with bulking material (sawdust and/or wood shavings) to facilitate transport. The resultant reduction in rig downtime considerably offset the costs incurred by using the drilling fluids of the present invention. The resulting drill cuttings were mixed with sawdust and/or wood shavings (45% w/w) at the rig site to facilitate transport and then delivered for bioremediation.

EXAMPLE 8

Vermicomposting of Drill Cuttings

The following illustrative test examples demonstrate the feasibility of utilizing vermicomposting for the bioremediation of drilling cuttings. Drill cuttings were recovered in a routine manner from the drilling of above noted test wells. Components of the drilling fluid have been previously discussed above.

First Test: This first test was conducted to determine the viability of vermicomposting for the bioremediation of drilling cuttings. The drill cuttings were mixed with sawdust and/or wood shavings (45% w/w) or other similar cellulose based material to facilitate transport and then delivered to the vermiculture site where they were blended with paunch waste from a slaughter house before being fed to the worm beds. The mixture of drill cuttings, saw dust and paunch waste is formulated to ensure that the correct proportion of carbon, nutrients and moisture are present. This blending step is an important precursory step in the vermicast production as the quality of the "feedstock" ultimately impacts upon the potential for optimal conditions to exist during the resultant vermicasting process. Because the bio-remediation of the mixture is an aerobic process, the optimum conditions for worm driven waste management of these materials is 75% (w/w) moisture, with a carbon nitrogen ratio of 25:1.

Once the blended material has been prepared it is loaded into a watertight wagon for application as "feedstock" for the worms to process in mounds referred to as "windrows". Each of these windrows is approximately 88 meters long by approximately 3 meters wide. There are approximately two meters wide access tracks between each of the windrows for access of the feed-out wagon to apply the mixed material, and also to allow for ongoing maintenance of the windrows and the subsequent vermiculture production processes.

The blended material is applied to the center/top of windrows, typically at an average depth of 15–30 mm on a weekly basis. The exact application rate depending upon climatic conditions. Generally the application rate was higher in summer than winter. The worms work the top 100 mm of each windrow, consuming the applied material over a five to seven-day period.

The windrows are aerated prior to each feeding procedure ensuring aerobic conditions within all of the beds. This aerator is attached to the linkage on the tractor and side arms guide any material (vermicast) back onto the beds ensuring no windrow exceeds the width to be covered by the covers themselves.

Each of the windrows is covered with a windrow cover, preferably a fiber mat with polypropylene backing. The covering allows for the necessary exclusion of light and avoids excessive wetting conditions occurring within the windrow, thus assisting in maintaining an optimally controlled environment in which the worms produce their castings. Controlled irrigation systems are periodically used on each the windrows to keep the covers moist to maintain a damp but not "wet" environment. The covering should be secured to prevent the cover from being removed by the elements. For example, each side of the preferred polypropylene/fiber matting is fitted with a D12 steel rod to act as a weight to stop wind lifting the covers off the bed.

Consumption rates can vary and are 100% of the worms body weight/day in the seasons of spring and autumn and 40% during the extremes of winter and summer. As a result, the volume and feed application rates and other important potential variables including the temperature, moisture content, pH, population dynamics, aerobic maintenance, and vermicast extraction techniques, are each required to be carefully monitored and varied accordingly. One of skill in the art of vermicomposting and vermiculture should be able to systematically vary each of these parameters in order to optimize the conditions within any particular windrow to maximize the bio-remediation process.

First Test Sampling and Analytical Procedures: 50-cc Grab samples were taken at time zero and then at approximately weekly intervals throughout the course of the test. Samples were transported by overnight courier to the analytical laboratory where they were stored at 4° C. prior to analysis. Tests for total petroleum hydrocarbons content according to the New Zealand Oil Industries Environmental Working Group (OIEWG) guidelines and recommendations.

Once in the laboratory the samples were ground with dry ice (Cryogrinding) prior to sub-sampling and subsequent analysis. Samples for total petroleum hydrocarbons determination were extracted using dichloromethane and sonication. The extracted samples were then dried with silica prior to analysis by GC-FID the detection limit of the procedure used by the laboratory being 60 mg/kg.

Data that is exemplary of the results of this study is presented below in Table 8

TABLE 8

| | Hydrocarbon content (GC-FID) (OIEWG carbon bands; mg/kg dry wt.) | | | | | | | |
|---|---|---|---|---|---|---|---|---|
| | Cuttings + Sawdust | 0 | 4 | 10 | 13 | 19 | 21 | 28 | Days |
| $C_7$–$C_9$ | <600 | <80 | <50 | <8 | <7 | <7 | <20 | <20 |
| $C_{10}$–$C_{14}$ | 41300 | 4600 | 2700 | 140 | 127 | 82 | <30 | <40 |
| $C_{15}$–$C_{36}$ | <2000 | <300 | <200 | <30 | 40 | <30 | <60 | <80 |
| Total | 41000 | 4600 | 2700 | 150 | 170 | 110 | <100 | <100 |

Figure 4:
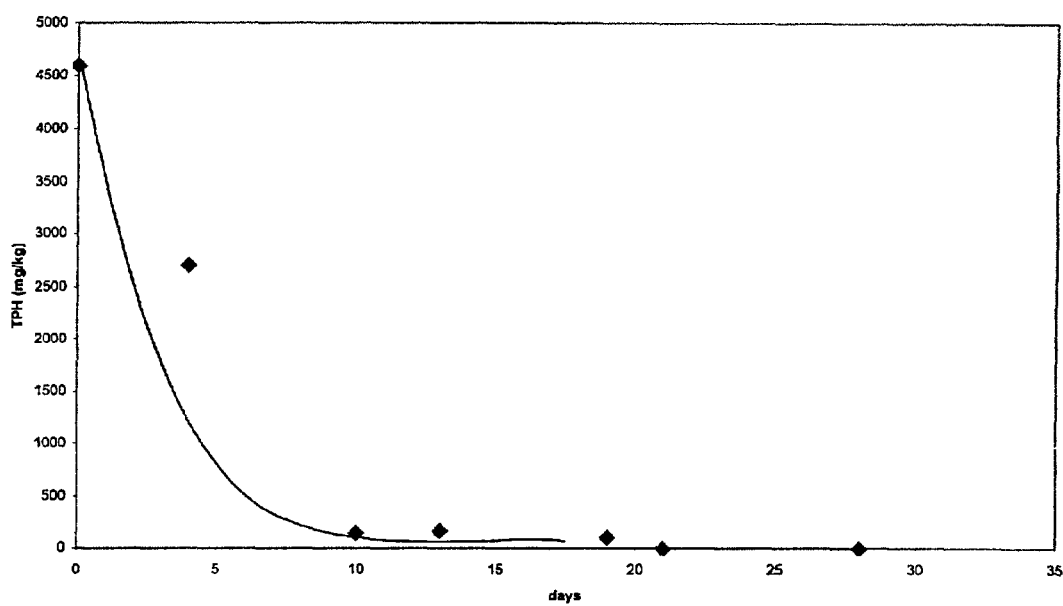
FIG. 4 is graphical representation of the exemplary sample data showing total petroleum hydrocarbon content detected by GC-FID (mg/kg dry weight)from the first test of vermicomposting.

The data from Table 8 for the total hydrocarbon content is shown graphically in FIG. 4.

First Test Results: In the first test the hydrocarbon concentrations decreased from 4600 mg/kg (dry wt) to less than 100 mg/kg (dry wt) in under 28 days with less than 200 mg/kg (dry wt) remaining after 10 days in what appears to be a fairly typical exponential type degradation curve FIG. 4.

The bulk of the hydrocarbons detected comprised $C_{10}$–$C_{14}$ aliphatic hydrocarbons which is in good agreement with the carbon chain length distribution of the $C_{12}$–$C_{17}$ linear paraffin blend used in this drilling fluid and indicates that there were no external sources of contaminating hydrocarbons.

There was no detectable excess mortality amongst the worms that the drill cuttings were fed to and although the numbers were not quantified, there appeared to be a definite preference among the worms for the area where the cuttings and paunch feed had been applied. It is not clear if this was due to the hydrocarbons attracting the worms or the increased availability of easily assimilated organic carbon/microbial biomass that would be associated with the highly biodegradable linear paraffins of the drill cuttings.

It was also noted that there was complete physical degradation of the cuttings by the vermidigestion process and none of the original intact cuttings could be found, the original cuttings size being 5–10 mm in diameter.

Upon review of the above data, one of ordinary skill in the art of bio-remediation should understand and appreciate that the vermicomposting process of the present invention has substantially reduced the hydrocarbon content of the drill cuttings.

Second Test: In this second test, variable amounts of drilling cuttings were mixed with the rumen material so as to determine the most suitable conditions for vermicomposting of drilling cuttings. The drilling cuttings utilized were conventionally recovered from the test wells noted above and processed to form vermicultre feed mixtures. The varying mixtures were applied to the windrows during vermiculture sites local Summer time as indicated below in Table 9.

TABLE 9

Experimental design summary

| | | Description |
|---|---|---|
| Treatment 1 | Bed #4 | Control, no drill cuttings, Paunch only |
| Treatment 2 | Bed #2 | 30:70 (w/w) drill cuttings: paunch material |
| Treatment 3 | Bed #3 | 50:50 (w/w) drill cuttings: paunch material |
| Treatment 4 | Bed #5 | 70:30 (w/w) drill cuttings: paunch material |
| Treatment 5 | Bed #1 | 100% drill cuttings; no paunch |

Drill cuttings were mixed with sawdust (45% w/w) to facilitate transport and then delivered to the vermiculture site. At the vermiculture site the drill cuttings mixed with sawdust was blended with paunch waste (undigested grass) from a slaughterhouse before being fed to the worm beds using an agricultural feed-out wagon of the sort used for feeding silage to livestock.

Successful degradation of organic materials by worms was obtained by providing optimum environmental conditions for the worms, including a carbon nitrogen ratio (25:1) and moisture content (75%). The drill cuttings were blended and mixed with the paunch material at variable ratios and then combined with water giving a 50:50 v/v water: solids slurry that could be evenly distributed from the feedout wagon. Blending and mixing of the drill cuttings, paunch wastes, green wastes and water was performed on a bunded concrete pad that is approximately 30 m by 15 m in diameter, giving 450 m² for controlled waste mixing and was carried out in a Marmix combined mixing and feedout wagon, the three internal augers of the trailer being used to ensure thorough mixing.

Once the blended material had been prepared it was loaded into a watertight "feed out" wagon for application as "feedstock" for the worms to process in mounds referred to as "windrows". The windrows were 88 m in length by 3 m wide. There are two meter-wide access tracks between each of the windrows for access of the feed-out wagon to apply the mixed material, and also to allow for ongoing maintenance of the windrows and the subsequent vermiculture production processes.

The blended material was applied to the center/top of the windrows, usually once a week at an average depth of 15–30 mm. The exact application rate depends upon climatic conditions and is higher in summer than winter. The worms "work" the top 100 mm of each windrow, consuming the applied material over a five to seven-day period. Once the test materials had been applied the worm beds were fed on a weekly basis with unamended paunch material as part of the normal worm driven waste management routine carried out at the site.

Each of the windrows was covered completely by a polypropylene-backed felt mat which excludes light from the worm bed and, although semi permeable to water, the polypropylene backing deflects heavy rainfall away from the surface of the bed and prevents the windrow from becoming waterlogged. This preferred practice maintains an optimum aerobic environment the worms to work in.

The windrows were also fitted with a controlled irrigation system that could be used to keep the covers moist and maintain the correct moisture content during periods of low rainfall.

As the use of worms for degradation of the mixture is an aerobic process the windrows are aerated prior to each feeding procedure to ensure aerobic conditions within all of the beds and maintain optimum conditions for the worms and their associated microbial processes. The aerator is attached to the power take-off linkage on the tractor and side arms guide any material (vermicast) back onto the beds, ensuring no windrow exceeds the width to be covered by the felt mat.

Once the worms had degraded the waste and converted the applied material into vermicastings (worm castings), the vermicast organic fertilizer was harvested using an industrial digger and was then packaged for distribution and use on agricultural and horticultural land as a beneficial fertilizer and soil conditioner.

Second Test Sampling and Analytical Procedures: Triplicate core samples were taken randomly and on an approximately weekly basis from a (6 m×3 m) sub section of each of the 5 research windrows using 60 mm diameter plastic core tubes. The core tubes were "screwed" all the way to the base of the windrow to ensured the sample contained any hydrocarbon material that might have migrated vertically down through the windrow, either as a result of leaching or mechanical or biological movement and transport.

All samples were analysed for total petroleum hydrocarbons content with more detailed soil chemistry and heavy metal analysis being performed on the time zero and 60-day (termination) samples to study the effect of the process on nutrient and heavy metal concentrations. Seasonal variations in temperature were recorded, as they are climatic factors that could influence rates of hydrocarbon degradation in the worm beds.

The following Table 10 gives a summarized description of the methods used to conduct the analyses in this illustrative example. The detection limits given below are those attainable in a relatively clean matrix. Detection limits may be higher for individual samples should insufficient sample be available, or if the matrix requires that dilutions be performed during analysis.

TABLE 10

| Parameter | Method Used | Detection Limit |
|---|---|---|
| pH | 1:2 water extraction of dried sample. pH read directly. | 0.1 pH Units |
| Electrical Conductivity (EC) | 1:2 water extraction of dried sample. Measured conductivity at 25° C. | 0.05 mS/cm in extract |
| Soluble Salts* | Calculation: measured EC (mS/cm) × 0.35. | 0.02 g/100 g |
| Total Nitrogen* | Determined by Dumas combustion procedure using Elementar VarioMAX instrument. | 0.02 g/100 g dry wt |
| Total Carbon* | Determined by Dumas combustion procedure using Elementar VarioMAX instrument. | 0.05 g/100 g dry wt |
| Zinc | Nitric/hydrochloric acid digestion. ICP-MS determination. | 0.1 mg/kg dry wt |
| Copper | Nitric/hydrochloric acid digestion. ICP-MS determination. | 0.05 mg/kg dry wt |
| Ammonium-N* | 1:2 water extraction on dried sample. FIA colorimetric determination, | 0.1 mg/L in extract |
| Nitrate-N | 1:2 water extraction on dried sample. FIA colorimetric determination, | 0.2 mg/L in extract |
| Nitrite-N | 1:2 water extraction on dried sample. FIA colorimetric determination, | 0.02 mg/L in extract |
| Phosphate-P | 1:2 water extraction on dried sample. FIA colorimetric determination, | 0.04 mg/L in extract |
| Arsenic | Nitric/hydrochloric acid digestion. ICP-MS determination. | 0.1 mg/kg dry wt |
| Mercury | Nitric/hydrochloric acid digestion. ICP-MS determination. | 0.01 mg/kg dry wt |
| Barium | Nitric/hydrochloric acid digestion. ICP-MS determination. | 0.01 mg/kg dry wt |
| Cadmium | Nitric/hydrochloric acid digestion. ICP-MS determination. | 0.005 mg/kg dry wt |

TABLE 10-continued

| Parameter | Method Used | Detection Limit |
|---|---|---|
| Chromium | Nitric/hydrochloric acid digestion. ICP-MS determination. | 0.1 mg/kg dry wt |
| Nickel | Nitric/hydrochloric acid digestion. ICP-MS determination. | 0.1 mg/kg dry wt |
| Lead | Nitric/hydrochloric acid digestion. ICP-MS determination. | 0.03 mg/kg dry wt |

All samples were analyzed for total petroleum hydrocarbons content with more detailed soil chemistry and heavy metal analysis being performed on the time zero and termination samples to study the effect of the process on nutrient and heavy metal concentrations. Seasonal variations in temperature were also recorded.

Second Test Results: There was no visual mortality among the treated earth worms and the hydrocarbon "fingerprint" matched the applied base fluid. It was also apparent that the applied drill cuttings mix caused the worms to actively seek out the clumps on material containing drill cuttings.

Figure 5:
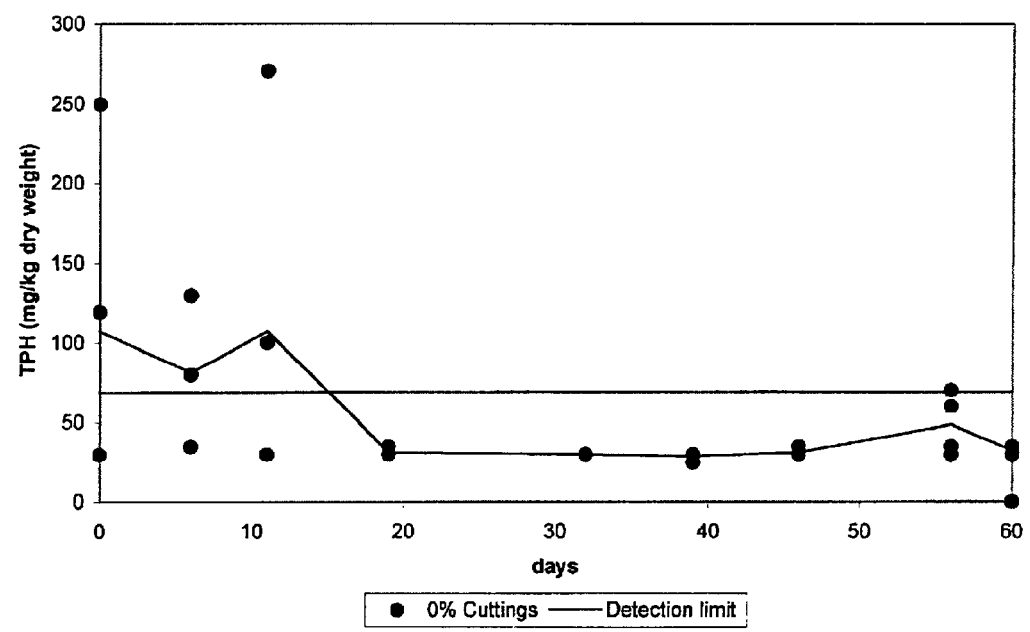
FIG. 5 is graphical representation of exemplary sample data showing the total petroleum hydrocarbon content detected by GC-FID (mg/kg dry weight) from the control sample of the second test of vermicomposting.
Figure 6:
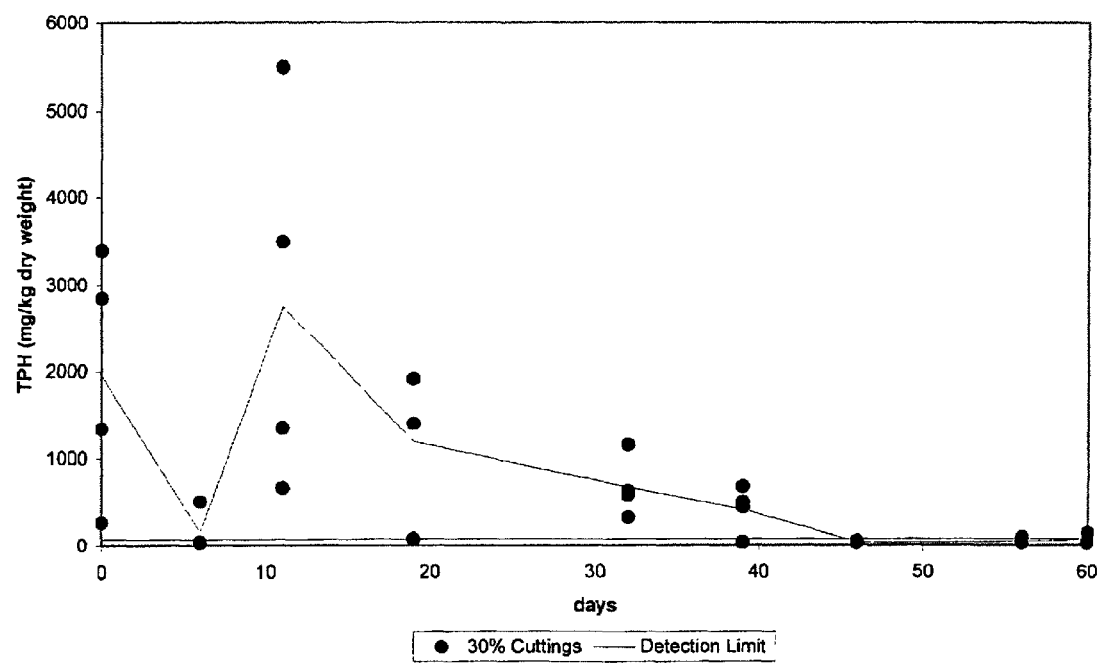
FIG. 6 is graphical representation of exemplary sample data showing the total petroleum hydrocarbon content detected by GC-FID (mg/kg dry weight) from the 30% w/w application rate sample of the second test of vermicomposting.
Figure 7:
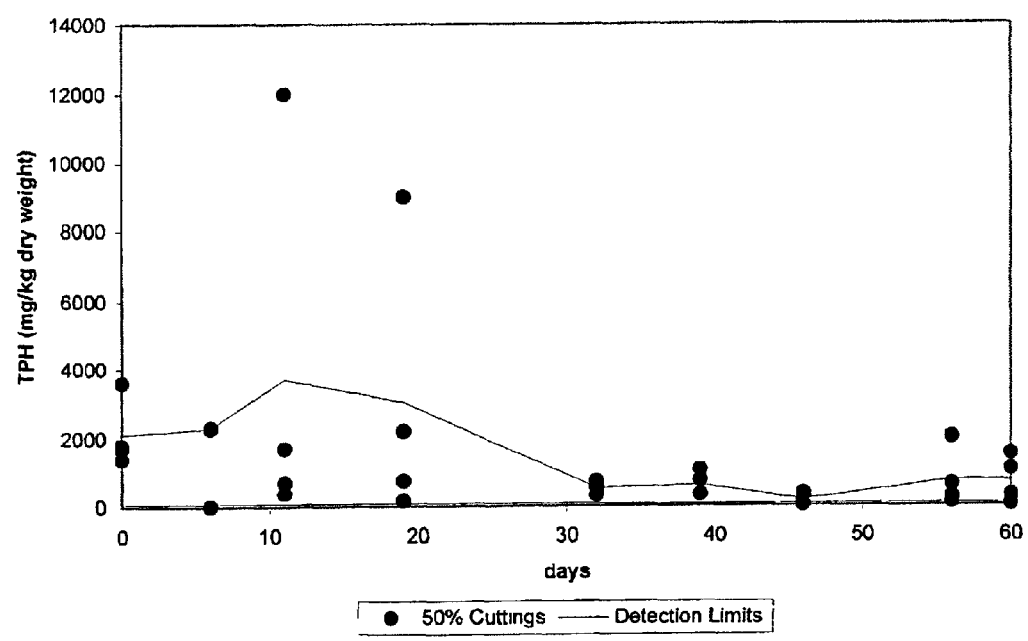
FIG. 7 is graphical representation of exemplary sample data showing the total petroleum hydrocarbon content detected by GC-FID (mg/kg dry weight) from the 50% w/w application rate sample of the second test of vermicomposting.
Figure 8:
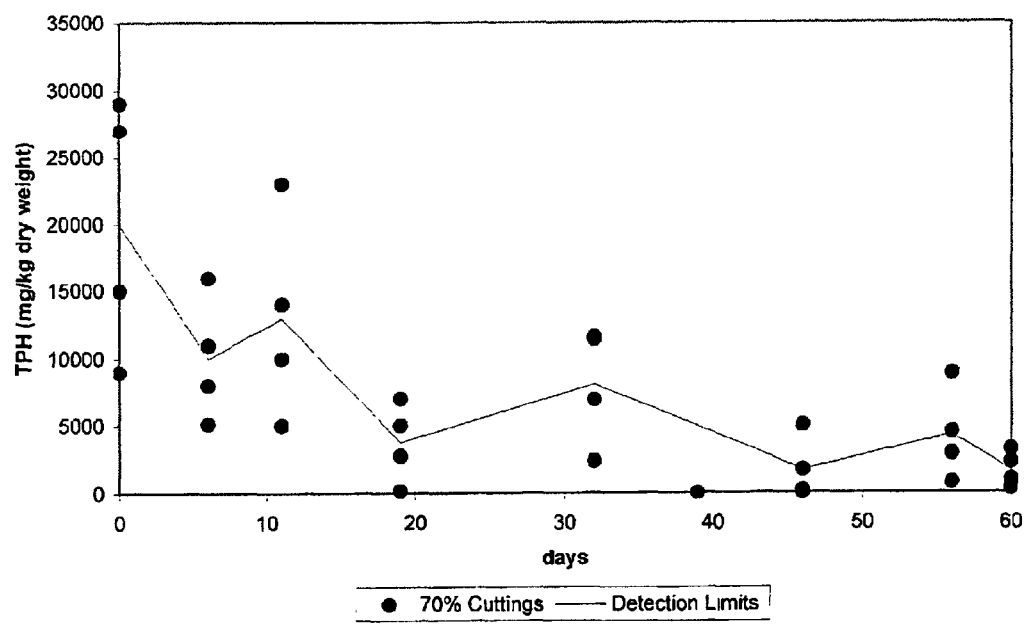
FIG. 8 is graphical representation of exemplary sample data showing the total petroleum hydrocarbon content detected by GC-FID (mg/kg dry weight) from the 70% w/w application rate sample of the second test of vermicomposting.
Figure 9:
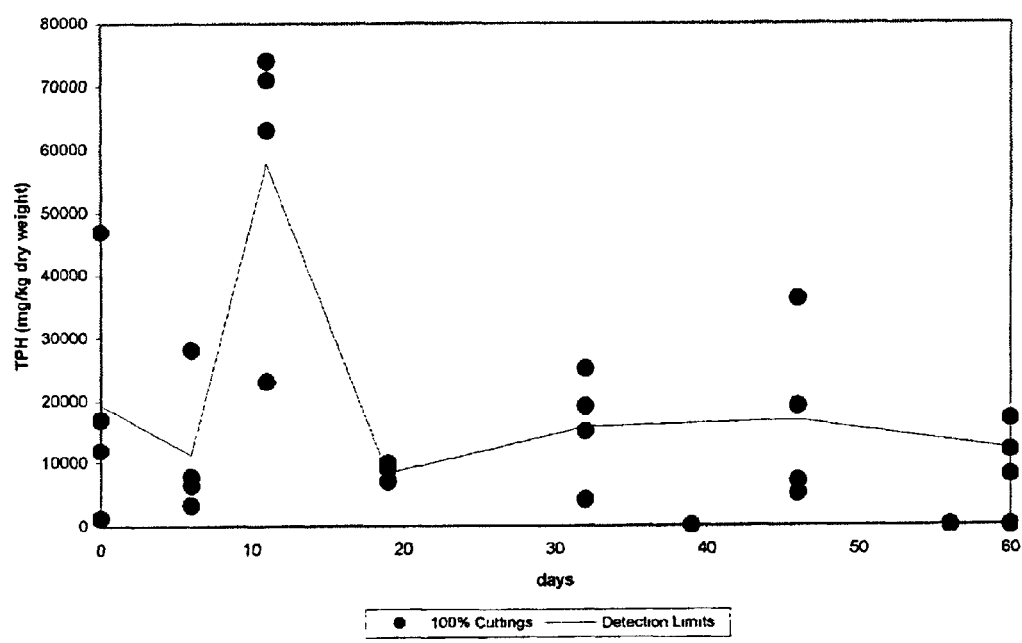
FIG. 9 is graphical representation of exemplary sample data showing the total petroleum hydrocarbon content detected by GC-FID (mg/kg dry weight) from the 100% w/w application rate sample of the second test of vermicomposting.
Figure 10:
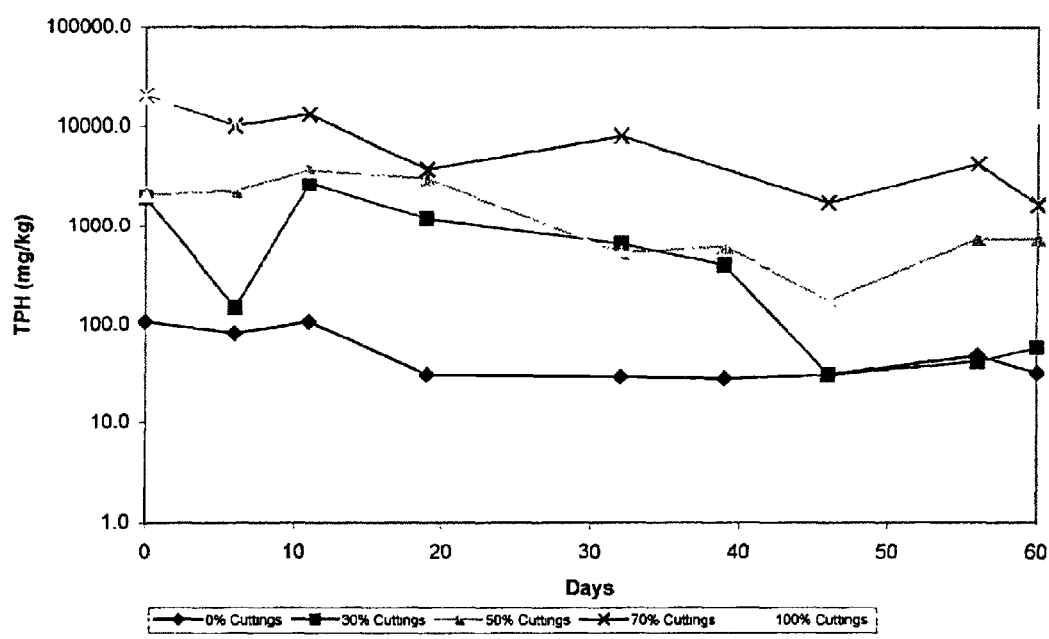
FIG. 10 is graphical representation of exemplary sample data of the average total petroleum hydrocarbon content detected by GC-FID (mg/kg dry weight) for all application rates of the second test of vermicomposting.

Total petroleum hydrocarbons: From the results shown in FIG. 5 it can be seen that the background hydrocarbon samples were around the detection levels for the method for the duration of the test indicating that there were no significant external sources of hydrocarbons being added to the worm beds apart from the test material Due to the heterogeneous manner in which the cuttings were applied to the worm bed some of the initial samples taken were very variable and this is reflected in the total petroleum hydrocarbons results shown in FIGS. 5, 6, 7, 8 and 9. However taken overall (FIG. 10) a number of general trends can be seen. The hydrocarbons in the cuttings applied at 30% w/w decreased from an average of 1900 mg/kg to less than 60 mg/kg within 45 days. The hydrocarbons in the cuttings applied at 50% w/w decreased from an average of 2100 mg/kg to the detection limit within 45 days but then showed a slight increase for some, unknown reason, although it may be related to the heterogeneity of the worm bed and sampling variation.

The hydrocarbons in the cuttings applied at 70% w/w showed quite a clear trend and decreased from an average of 20,000 mg/kg to 1500 mg/kg within 45 days but there was no subsequent reduction in the hydrocarbon concentration after this time. After the initial degradation it was found that the clumps of cuttings and feed mixture within the worm bed had dried out and become compacted making them unpalatable to the worms. This suggests that, as the worms are not breaking down the cuttings, that the degradation is no longer worm driven but purely microbial and this is not expected to be particularly fast given the unfavorable conditions and lack of moisture within the cutting/feed mix clumps. This also means that as the worm beds were regularly fed with unammended paunch material that the cuttings will move out of the worms feeding zone further reducing the rate of degradation.

The hydrocarbons in the cuttings applied at 100% w/w (without any paunch amendments) did not show any obvious degradation throughout the course of the test (60 days). It is thought that this is because the consistency of the cuttings (mixed with sawdust to facilitate transport) combined with that lack of paunch material (which constitutes a large part of the worm "normal" diet) makes the cuttings very "unappealing" to the worms and prevents the worms from degrading the material.

Overall the rates of hydrocarbon degradation were slower in the second test than in the first and this is thought to be due to the prevailing weather and climatic conditions.

The importance of the worms in enhancing the rates of hydrocarbon degradation is shown by the much slower rates of decrease in hydrocarbon concentration in samples of cuttings blended with paunch material that were in parts of the windrow that were inaccessible to the worms and were not tilled and aerated.

Figure 11:
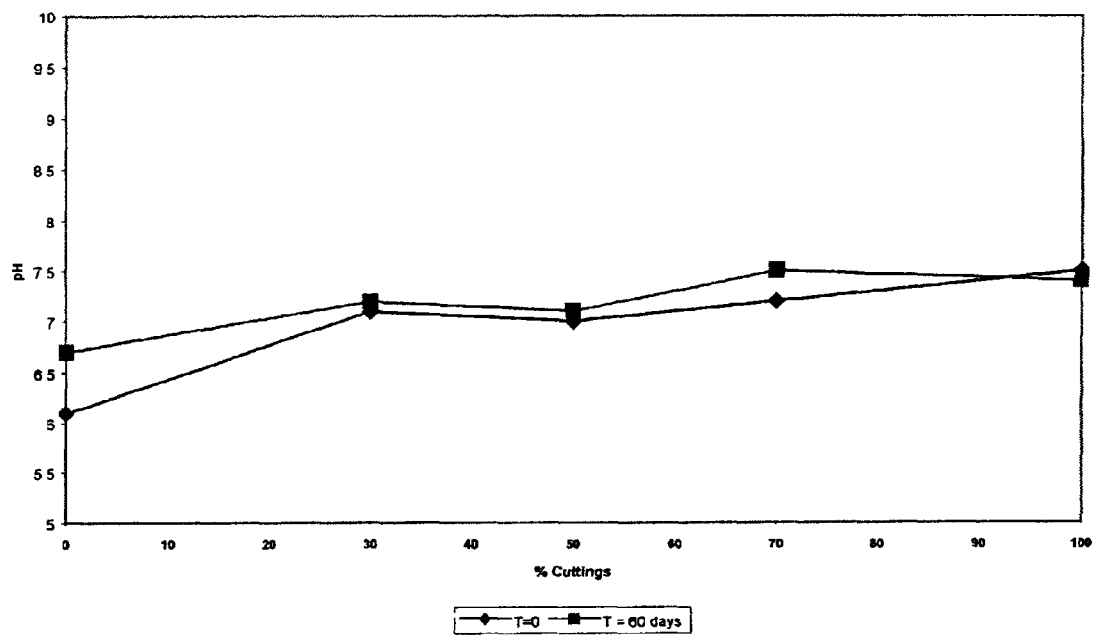
FIG. 11 is graphical representation of exemplary data of the soil pH values at the initial starting point (T=0) and endpoint (T=60 days).
Figure 12:
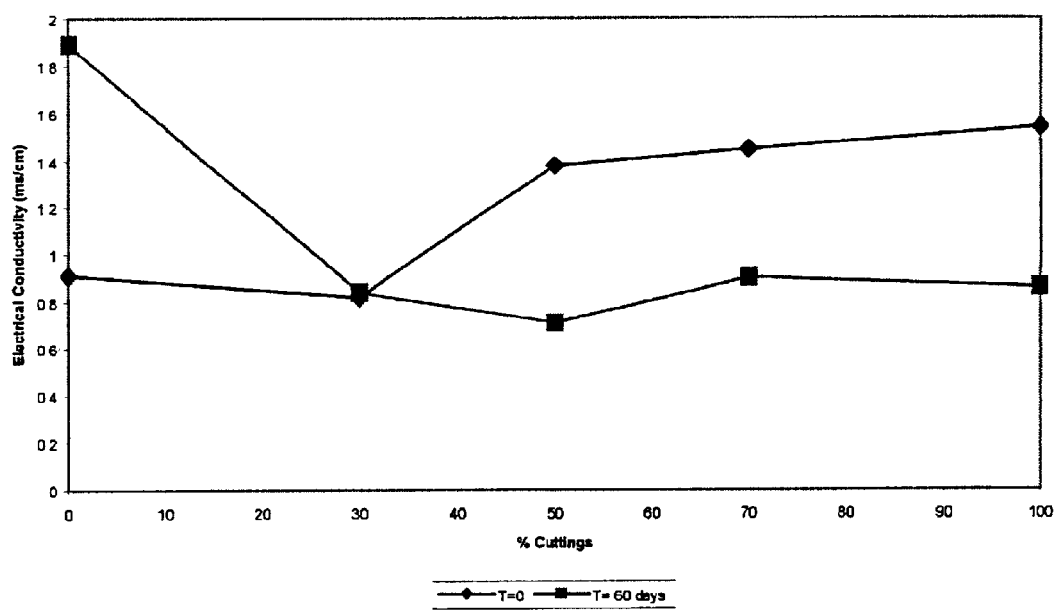
FIG. 12 is graphical representation of exemplary data of the soil electrical conductivity values at the initial starting point (T=0) and endpoint (T=60 days).
Figure 13:
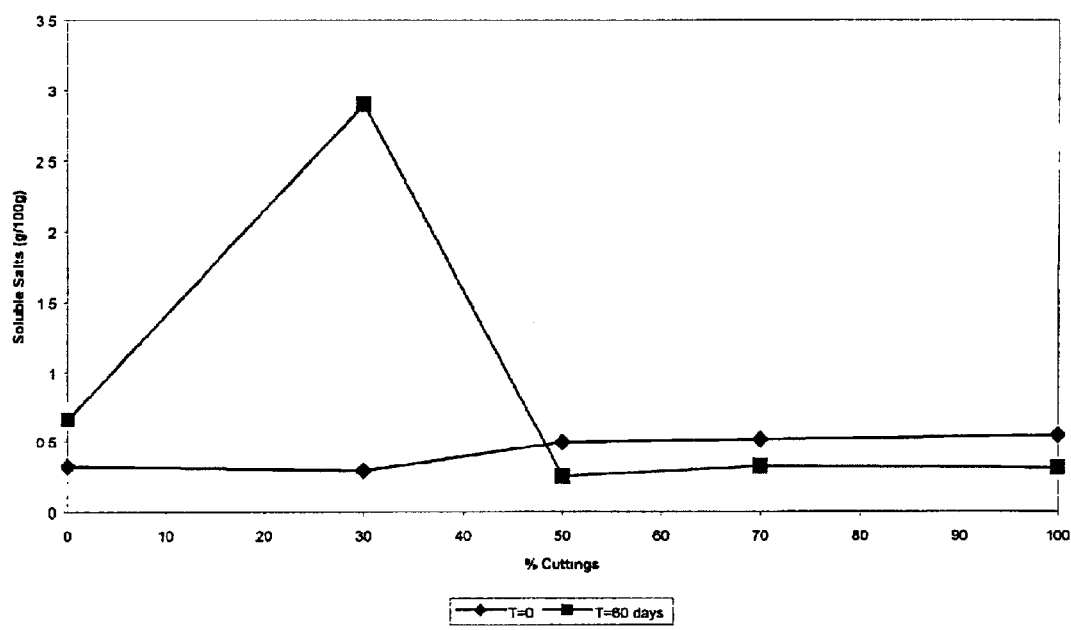
FIG. 13 is graphical representation of exemplary data of the soil soluble salt content values at the initial starting point (T=0) and endpoint (T=60 days).
Figure 14:
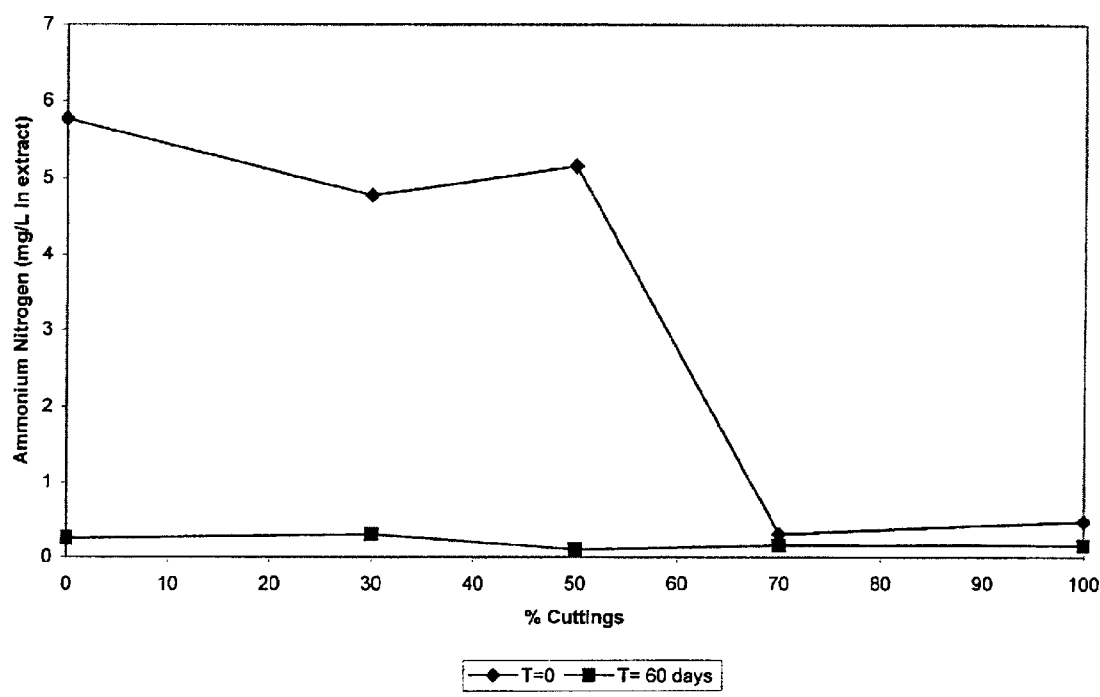
FIG. 14 is graphical representation of exemplary data of the soil ammonium nitrogen concentration values at the initial starting point (T=0) and endpoint (T=60 days).
Figure 15:
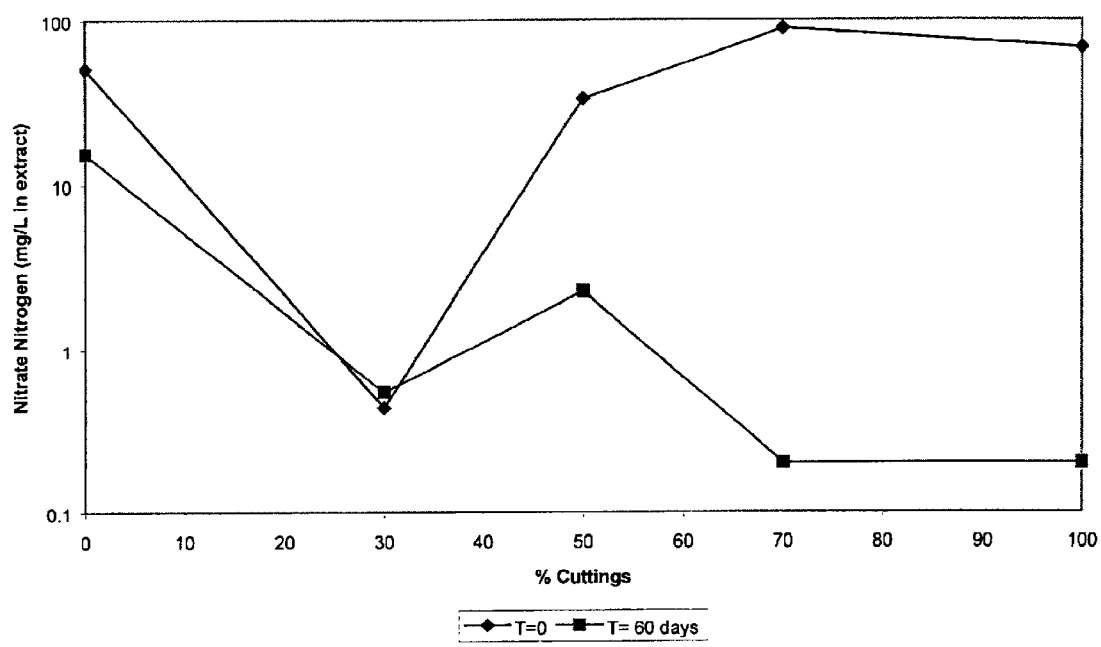
FIG. 15 is graphical representation of exemplary data of the soil nitrate nitrogen concentration values at the initial starting point (T=0) and endpoint (T=60 days).
Figure 16:
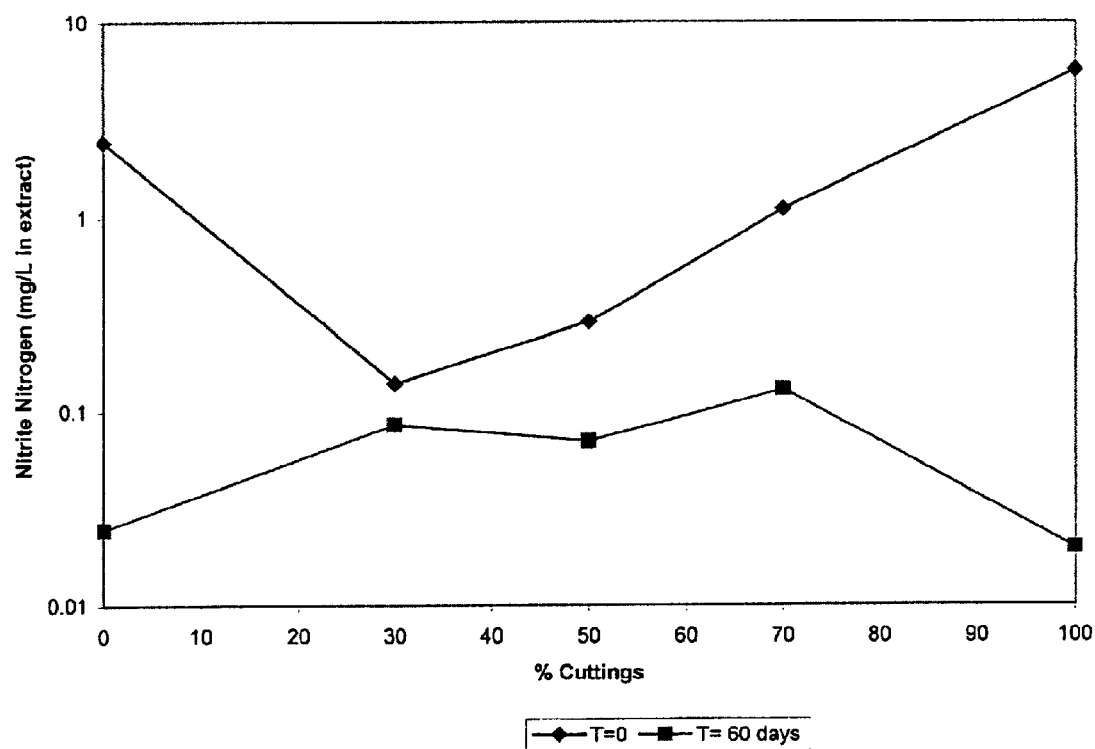
FIG. 16 is graphical representation of exemplary data of the soil nitrite nitrogen concentration values at the initial starting point (T=0) and endpoint (T=60 days).
Figure 17:
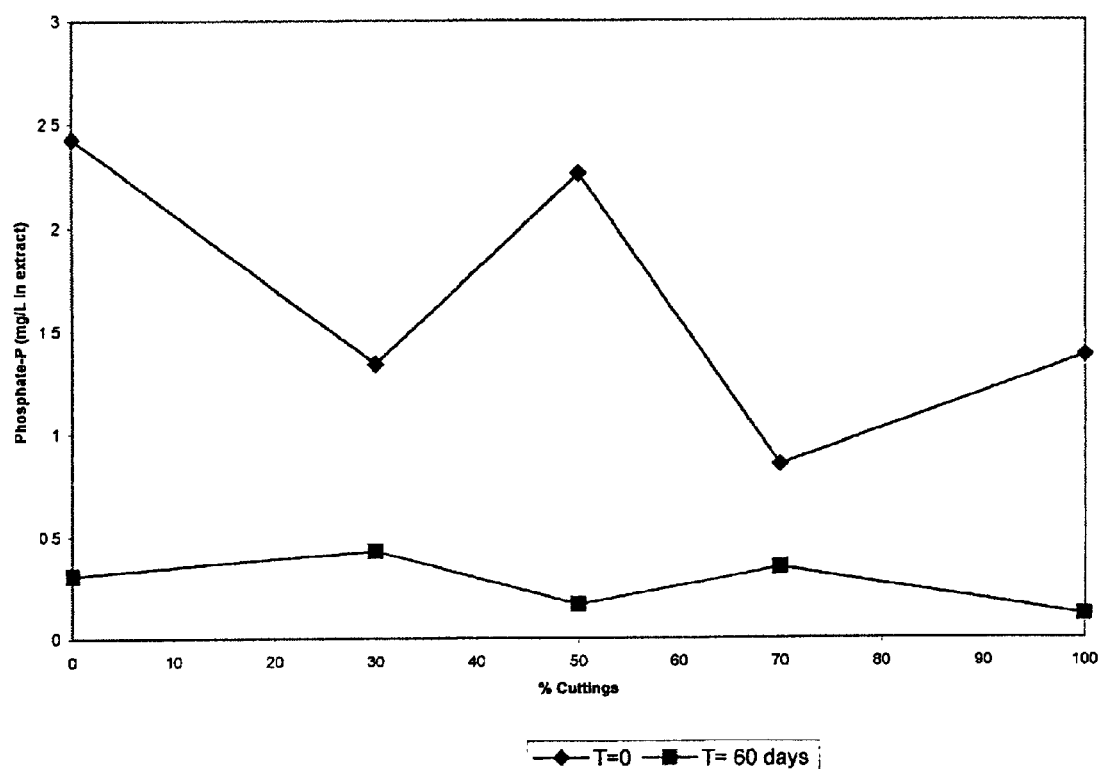
FIG. 17 is graphical representation of exemplary data of the soil phosphate phosphorous concentration values at the initial starting point (T=0) and endpoint (T=60 days).

Soil Chemistry: Looking at the pH data shown in FIG. 11 it can be seen that there is slight increase in pH as more cuttings are applied to the worm bed and that the pH tends to be slightly higher at the end of the experiment. This would be caused by the slightly alkaline nature of the drill cuttings and base fluid and the release of the lime from the drilling fluid emulsion as it is broken down. The increase in pH is not sufficiently high the adversely affect the earth worms.

The remaining soil chemistry results are given in FIGS. 12 to 17. Electrical conductivity is a measure of the total salt or ion content within the sample and can have significant effects of soil properties such as the cation exchange capacity etc. At time zero the electrical conductivity can be seen to generally increase (see FIG. 12) as more cuttings are applied. This probably reflects the use of calcium ammonium nitrate in the brine phase of the drilling fluid, the more cuttings added the higher the electrical conductivity. At the end of the test the electrical conductivity is constant for all the windrows to which drill cuttings were added, suggesting that if this is the case, that either the bacteria have utilized the calcium ammonium nitrate or the earthworms involved in the remediation process. This is confirmed by the other soil chemistry data for nitrogen containing materials (see FIGS. 14, 15, 16). It is not clear why the electrical conductivity in the control (no added drill cuttings) should differ at the start and finish of the test as these would be expected to be the same unless the worm driven waste management process results in the mobilization of salts, which are subsequently re-used at a faster rate in the treated worm beds and which are assumed to have a more dynamic microbial population because of the presence of the readily biodegradable linear paraffins.

As mentioned previously the nitrogen and phosphorous containing compounds when taken overall one of ordinary skill in the art should conclude that the concentration of these elements, which are essential for microbial degradation and growth decrease over the course of the test as they are used up by the bacteria involved in the degradation process and converted into microbial and earth worm biomass.

Figure 18:
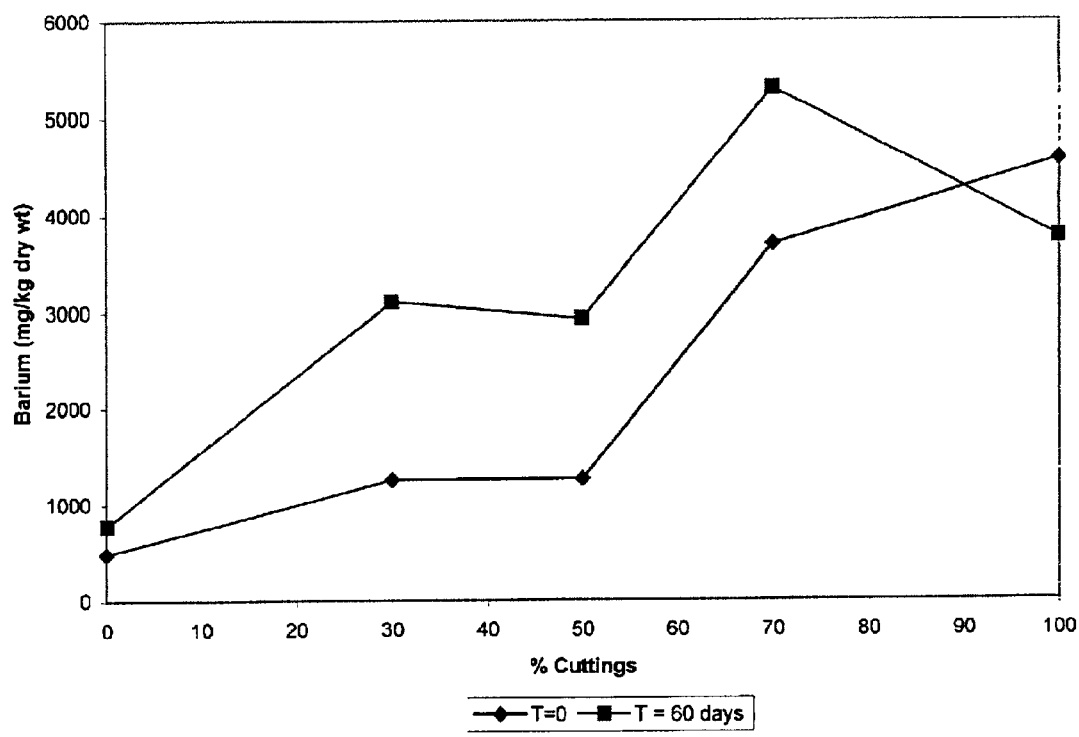
FIG. 18 is graphical representation of exemplary data of the soil barium concentration values at the initial starting point (T=0) and endpoint (T=60 days).

Heavy Metals: The barium concentrations shown in FIG. 18 were used as a conservative marker to ensure that the hydrocarbons were being degraded within the cuttings pile and that there was no loss of the cuttings through physical removal. Looking at the results one of skill in the art should see that as more cuttings are added to the worm bed, the barium concentration increases. It is however, interesting to note that the barium concentration in the highest application rate is lower at the end of the test than at the start. Currently we do not have an explanation for this phenomenon but it is interesting to note that the decrease in barium concentration occurred in the windrow with the least microbial and earth worm degradation of the drill cuttings (100% w/w application with no added paunch material) suggesting that it could be linked to bioaccumulation of the metal.

Figure 19:
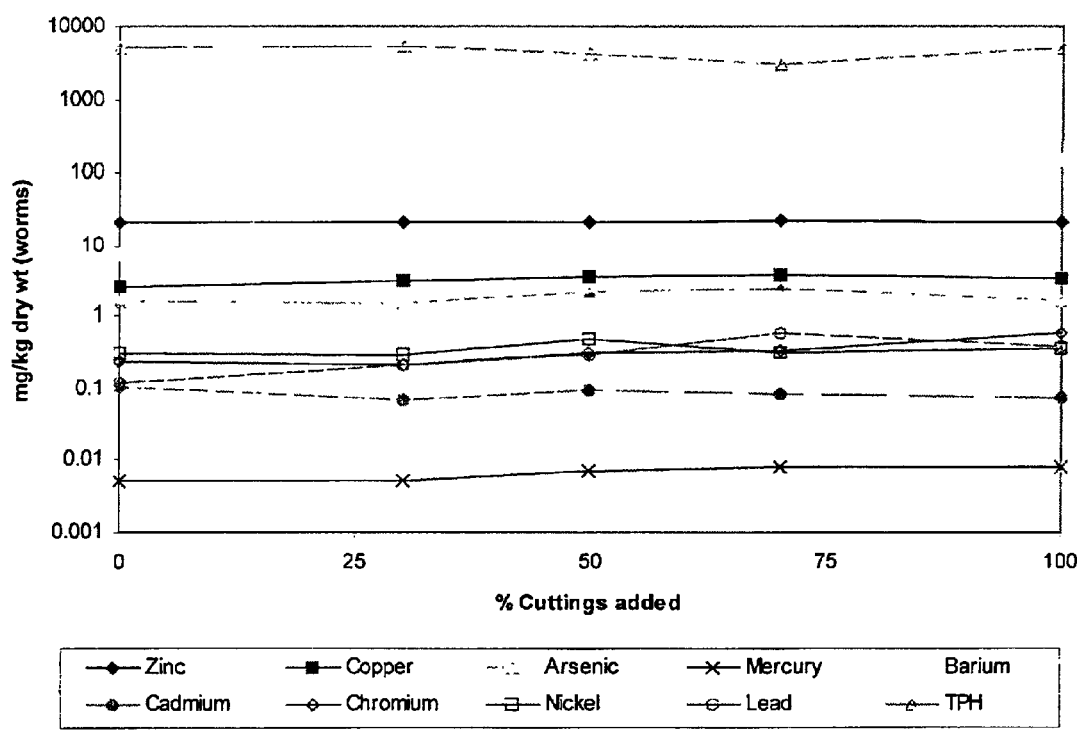
FIG. 19 is graphical representation of exemplary data of the soil heavy metal concentration values at the initial starting point (T=0) and endpoint (T=60 days).

Heavy metal bioaccumulation: As earthworms are known to accumulate heavy metals within their tissues, samples of earth worms were analyzed for heavy metal content at the end of the experiment. Looking at the results shown in FIG. 19 it can be seen that while most of the metal concentrations remain fairly constant at the different cuttings application rates, there is a slight increase in the lead concentration within the earth worm's tissues coupled with a more obvious increase in the barium concentration in the 30%, 50% and & 70% w/w additions. It is interesting to note that the barium and lead levels show a slight decrease at highest rate of addition (where there was very little biological "working" of the cuttings), presumably because the worms were not ingesting the cuttings in large amounts therefore there was less bioaccumulation. This reduced rate of activity in the 100% addition may also explain some of the other variations in nutrient levels etc Third Test: The third test was conducted utilizing 30% and 50% w/w drill cuttings mixture were repeated during local Winter time at the vermiculture facility. The same methods described above in the previsous were utilized.

Third Test Sampling and Analytical Procedures: Initially six core samples were taken from each of the treatment areas (total sample weight approximately 1 KG), and combined together at the test site in large mixing container where they were thoroughly mixed prior to sub-sampling a 250–300 gm composite sample, which was subsequently sent for analysis. After five days the number of core samples was reduced to four but the mixing and sub-sampling procedure remained the same.

Third Test Results: Upon review of the results of the present test, one of skill in the art should understand and appreciate that the climatic conditions for the winter test (Test2) did not favor maximum rates of degradation in the worm beds and the sample variability needed to be reduced. Thus it was decided to repeat the test a third time under more favorable environmental conditions using a modified sampling procedure as discussed above.

Again there was no visual mortality of the worms and they appeared to actively seek out the clumps of drill cuttings.

Total Petroleum Hydrocarbons: As in previous experiments no significant amounts of hydrocarbons were found in the windrows that did not have cuttings applied (see FIG. 20) while the 30 and 50% application rates showed significant degradation of hydrocarbons to background levels within 30 days. The initial results for the cuttings applied at 30% w/w are somewhat erroneous due to incorrect analytical procedures being used for these samples resulting in the loss of some of the volatile hydrocarbon fractions. However, one of skill in the art will notice that a clear decrease in hydrocarbon concentration can still be seen.

Soil Chemistry: The soil chemistry parameters for the third test were also somewhat inconclusive although there did appear to be similar trends to those observed in the second test, i.e. a general decrease in the nitrogen and phosphorous containing compounds as they are used up in the microbial degradation process.

Heavy Metals: As in the second test barium concentrations in the samples increased when drill cuttings were applied, but the limited number of samples analyzed for barium at the start and finish of the test make it difficult to draw any firm conclusions.

The worms did show an increase in a number of heavy metals after feeding on material containing drill cuttings and barite weighting material but it is not clear if the heavy metals were found in the worm's gut or tissues even though the worms were fasted for 24 hours before sampling. This length of time might not be long enough to purge the gut contents, but as this is an important question it is intended to be the subject of further studies aimed at better understanding the degradation process and bioaccumulation or change in the bioavailability of the heavy metals.

The results of the above series of tests should indicate to one of ordinary skill in the art that under suitable conditions there is substantial degradation of the hydrocarbons within the worm bed. Factors such as temperature effect rates of hydrocarbon degradation. Good husbandry of the worms appears to be important to the success of the process and this is shown by the use of a 30–50% cuttings addition. Any higher and the cuttings and hydrocarbons are less available to the worms or are unpalatable (100% w/w) and are not degraded. Cuttings which are unpalatable to the worms will eventually become buried in the worm cast as more food is applied to the worms beds and move out of the feeding zone, meaning that the degradation is no longer worm driven. Upon consideration and review by one of ordinary skill in the art, optimum benefit is obtained from the synergistic use of drilling fluids designed for bioremediation and vermiculture technology, the worms being used to add value to the cleaned cuttings and further reducing disposal costs.

In view of the above disclosure and examples, one of ordinary skill in the art should appreciate that one illustrative embodiment of the present invention includes a biodegradable wellbore fluid, suitable for drilling subterranean wells, with an oleaginous phase including a linear paraffin having 11–18 carbon atoms, a non-oleaginous phase containing a salt of a biodegradable anion, and an emulsifying agent in a concentration capable of forming an oleaginous fluid suitable for use as a drilling fluid. A weighting agent, fluid-loss reducing agent, and viscosifying agent may also be present. The oleaginous phase may comprise from about 30 to 99% by volume of the wellbore fluid, and the non-oleaginous phase may comprise from about 1% to about 70% by volume off the wellbore fluid. The non-oleaginous phase may be selected from fresh water, a brine containing organic or inorganic dissolved salts, a liquid containing water-miscible organic compounds, or combinations thereof. The emulsifying agent is preferably an eurisic diglyceride or other chemically similar compounds. The weighting agent may be selected from calcium carbonate, hematite, ilmenite, barite, mullite, gallena, magnanese oxides, iron oxides and combinations thereof. The viscosifying agent may be an organophilic clay.

One of skill in the art should appreciate that another illustrative embodiment of the present invention includes a method of producing a biodegradable wellbore fluid by blending an oleaginous phase with a linear paraffin having 11–18 carbon atoms, a non-oleaginous phase containing a salt of a biodegradable anion and substantially free of halogen ions, and an emulsifying agent in a concentration capable of forming an oleaginous suitable for use as a drilling fluid.

A further illustrative embodiment of the present invention involves drilling a subterranean well by attaching a cutting bit to a length of drill pipe, rotating the cutting bit, and removing cuttings from around the bit with a drilling fluid which is a biodegradable fluid. This fluid contains an oleaginous phase with a linear paraffin having 11–18 carbon atoms, a non-oleaginous phase containing a salt of a biodegradable anion, and an emulsifying agent in a concentration capable of forming an oleaginous suitable for use as a drilling fluid. The cuttings removed from the well may be bioremediated using, land farming, conventional composting, a bioreactor or by vermi-composting.

Another illustrative embodiment of the present invention is a method of bio-remediation involving the drilling of a subterranean well with a fluid containing an oleaginous phase with a linear paraffin having 11–18 carbon atoms, a non-oleaginous phase containing a salt of a biodegradable anion and substantially free of halogen ions, and an emulsifying agent in a concentration capable of forming an oleaginous fluid suitable for use as a drilling fluid. The cuttings are removed from the well, transported to a remediation site, and blended with nutrients to create a treatment feed. This treatment feed is spread on land for composting, or placed in a bioreactor for bacteria to perform the remediation. The treatment feed may also be pretreated in a bioreactor or compost vessel before it is spread on land.

Additionally, one of skill in the art should recognize that another illustrative embodiment of the present invention involves a soil amendment made from cuttings from a wellbore which was drilled using a fluid of the present invention and sawdust, wood shavings, paunch waste or mixtures thereof. The soil amendment may be created by drilling a subterranean well with a drilling fluid containing an oleaginous phase with a linear paraffin having 11–18 carbon atoms, a non-oleaginous phase containing a salt of a biodegradable anion, and an emulsifying agent in a concentration capable of forming an oleaginous fluid suitable for use as a drilling fluid. The cuttings are removed from the well and transported to a remediation site where nutrients are blended in to create a treatment feed. The treatment feed is spread on a land-farm where bacteria perform the remediation. The treatment feed may be pretreated in a bioreactor or composting vessel prior to land remediation.

In further view of the above disclosure, one of ordinary skill in the art should understand and appreciate that one illustrative embodiment of the present invention includes a method of biodegrading drilling cuttings coated with a drilling fluid by vermicomposting. The drilling fluid formulation utilized in such an illustrative method includes a linear paraffin having 11–18 carbon atoms, a non-oleaginous phase, and an emulsifying agent. The drilling fluid is formulated such that it is biocompatible with vermicomposting. In one illustrative embodiment, the method includes mixing the drilling cuttings with a compostable waste material so as to provide a compostable balance of nitrogen and carbon content. Within one such illustrative embodiment the nitrogen and carbon content have a ratio of about 2:1 to about 100:1 and more preferably the nitrogen and carbon content has a ratio of about 25:1. In one embodiment of the present invention, the vermicomposting is carried out in a bioreactor and in such instances the vermiculture bioreactor is selected from a bin vermicomposter, a rotating drum vermicomposter, windrows, covered windrows and combinations of these. The drilling fluid utilized in the above noted illustrative embodiment should be formulated such that it is useful in the drilling of subterranean wells. In one such instance the drilling fluid includes a weighting agent, a fluid loss control agent and/or similar such compounds typically utilized in the formulation of drilling fluids. Of importance is that such alternative components of the drilling fluid should not substantially harm the biocompatability of the drill cuttings with vermiculture. Likewise, the non-oleaginous fluid utilized in the above illustrative embodiment should not substantially harm the biocompatability of the drill cuttings with vermiculture. In one preferably illustrative embodiment, the non-oleaginous fluid is selected from fresh water, sea water, a brine containing organic or inorganic dissolved salts, a liquid containing water-miscible organic compounds, combinations of these and similar compounds. As previously noted, the emulsifying agent utilized in the formulation of the drilling fluids used in the above noted illustrative embodiments can be selected from a wide range of suitable emulsifying agents. However, such selection is made such that the emulsifying agent is does not substantially harm the biocompatability of the drill cuttings with vermiculture. One such preferred emulsifying agent is an eurisic diglyceride.

The present invention also includes a method for biodegrading drilling cuttings coated with a drilling fluid. One such illustrative method that should be apparent to one of ordinary skill in the art is a method including exposing the drilling cuttings to a vermicomposting environment for a sufficient period of time to permit the worms to biodegrade the organic components of the drilling fluid. Within such an illustrative method the drilling fluid is formulated to include linear paraffin having 11–18 carbon atoms, a non-oleaginous phase, and an emulsifying agent. In one illustrative embodiment, the method includes mixing the drilling cuttings with a compostable waste material so as to provide a compostable balance of nitrogen and carbon content. Within one such illustrative embodiment the nitrogen and carbon content have a ratio of about 2:1 to about 100:1 and more preferably the nitrogen and carbon content has a ratio of about 25:1. In one embodiment of the present invention, the vermicomposting is carried out in a bioreactor and in such instances the vermiculture bioreactor is selected from a bin vermicomposter, a rotating drum vermicomposter, windrows and combinations of these. The drilling fluid utilized in the above noted illustrative embodiment should be formulated such that it is useful in the drilling of subterranean wells. In one such instance the drilling fluid includes a weighting agent, a fluid loss control agent and/or similar such compounds typically utilized in the formulation of drilling fluids. Of importance is that such alternative components of the drilling fluid should not substantially harm the biocompatability of the drill cuttings with vermiculture. Likewise, the non-oleaginous fluid utilized in the above illustrative embodiment should not substantially harm the biocompatability of the drill cuttings with vermiculture. In one preferably illustrative embodiment, the non-oleaginous fluid is selected from fresh water, sea water, a brine containing organic or inorganic dissolved salts, a liquid containing water-miscible organic compounds, combinations of these and similar compounds. As previously noted, the emulsifying agent utilized in the formulation of the drilling fluids used in the above noted illustrative embodiments can be selected from a wide range of suitable emulsifying agents. However, such selection is made such that the emulsifying agent is does not substantially harm the biocompatability of the drill cuttings with vermiculture. One such preferred emulsifying agent is an eurisic diglyceride.

The present invention also includes a method of vermicular bio-remediation of oil contaminated solids. One such illustrative embodiment includes a method including providing the oil contaminated solids to a vermicular bioreactor, and allowing the worms within the vermicular bioreactor to biodegrade the oil contaminated solids. The drilling fluid is formulated such that it is biocompatible with vermicomposting. Within such an illustrative method, the drilling fluid is formulated to include linear paraffin having 11–18 carbon atoms, a non-oleaginous phase, and an emulsifying agent. In one illustrative embodiment, the method includes mixing the drilling cuttings with a compostable waste material so as to provide a compostable balance of nitrogen and carbon content. Within one such illustrative embodiment the nitrogen and carbon content have a ratio of about 2:1 to about 100:1 and more preferably the nitrogen and carbon content has a ratio of about 25:1. In one embodiment of the present invention, the vermicomposting is carried out in a bioreactor and in such instances the vermiculture bioreactor is selected from a bin vermicomposter, a rotating drum vermicomposter, windrows and combinations of these. The drilling fluid utilized in the above noted illustrative embodiment should be formulated such that it is useful in the drilling of subterranean wells. In one such instance the drilling fluid includes a weighting agent, a fluid loss control agent and/or similar such compounds typically utilized in the formulation of drilling fluids. Of importance is that such alternative components of the drilling fluid should not substantially harm the biocompatability of the drill cuttings with vermiculture. Likewise, the non-oleaginous fluid utilized in the above illustrative embodiment should not substantially harm the biocompatability of the drill cuttings with vermiculture. In one preferably illustrative embodiment, the non-oleaginous fluid is selected from fresh water, sea water, a brine containing organic or inorganic dissolved salts, a liquid containing water-miscible organic compounds, combinations of these and similar compounds. As previously noted, the emulsifying agent utilized in the formulation of the drilling fluids used in the above noted illustrative embodiments can be selected from a wide range of suitable emulsifying agents. However, such selection is made such that the emulsifying agent is does not substantially harm the biocompatability of the drill cuttings with verminculture. One such preferred emulsifying agent is an eurisic diglyceride.

One of ordinary skill in the art should also appreciate and understand that the present invention also includes a vermiculture feed composition. One such illustrative vermiculture feed composition includes oil-contaminated solids, a bulking agent, and a compostable nitrogen source.

Within such an illustrative embodiment, the oil-contaminated solids are selected from drill cuttings, drilling mud, oil contaminated soil, combinations of these and similar compositions in which a biocompatible material is contaminated with oil. The illustrative vermiculture feed composition preferably includes a cellulose based bulking agent such as sawdust, wood shavings, rice hulls, canola husks, shredded newsprint/paper; shredded coconut hulls, cotton seed hulls, mixtures of these and similar materials. Similarly, the illustrative vermiculture feed composition preferably includes a compostable nitrogen source preferably selected from yard or household wastes, food preparation or processing wastes, paunch or rumen material or similar animal rendering wastes, sewage sludge from a water treatment facility and mixtures of these and other similar materials. The illustrative vermiculture compositions preferably have a carbon to nitrogen ratio and a moisture content that is compatible with vermicomposting of the compositions. More preferably the carbon to nitrogen ratio is about 25:1 and the moisture content is about 75% by weight. In one illustrative embodiment, the vermiculture composition also includes pretreated or pre-composted materials such as municipal waste or industrial waste materials. Alternatively, the vermiculture composition is pre-treated or pre-composed prior to being used in vermiculture.

The present invention also includes the products of the process disclosed herein. That is to say the present invention includes a vermicast composition including: vermicast and biodegraded drill cuttings. Such composition is useful as organic material or compost material for domestic gardening or commercial farming.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention.

What is claimed is:

1. A vermiculture composition comprising: a plurality of worms; oil contaminated solids, an oleaginous phase substantially composed in places thereof, a linear paraffin having 11–18 carbon atoms; a bulking agent; a compostable nitrogen source: a non-oleaginous phase containing a salt in places thereof, a biodegradable anion; and an emulsifying agent in a concentration capable in places thereof, forming an invert emulsion suitable for use as a drilling fluid.

2. The composition of claim 1 wherein the oil contaminated solids are selected from the group consisting of drill cuttings, drilling mud, oil contaminated soil, and combinations thereof.

3. The composition of claim 1 wherein the bulking agent is selected from the group consisting of sawdust, wood shavings, rice hulls, canola husks, shredded newsprint/paper; shredded coconut hulls, cotton seed hulls, and mixtures of these.

4. The composition of claim 1 wherein the compostable nitrogen source is selected from the group consisting of yard wastes, household wastes, farm wastes, food preparation wastes, food processing wastes, paunch material, rumen material, animal rendering wastes, sewage sludge, and mixtures of these.

5. The composition of claim 1 wherein the composition has a carbon to nitrogen of about 25:1 and a moisture content of about 75% by weight.

6. The composition of claim 1 wherein the composition further includes pretreated or pre-composted materials.

7. A vermiculture composition comprising: a plurality of earth worms, oil contaminated solids, a bulking agent, a compostable nitrogen source, linear paraffin, a non-oleaginous phase containing a salt of a biodegradable anion, and an emulsifying agent.

8. The vermiculture composition of claim 7 wherein oil contaminated solids are selected from the group consisting of drill cuttings, drilling mud, oil contaminated soil, and combinations thereof.

9. The vermiculture composition of claim 7 wherein the nitrogen and carbon content has a ratio of about 2:1 to about 100:1.

10. The vermiculture composition of claim 7 wherein the non-oleaginous phase includes a non-oleaginous liquid and a salt of a biodegradable anion, and wherein the emulsifying agent is a biodegradable emulsifying agent.

11. A vermiculture feed composition comprising:

oil contaminated solids wherein the oil contaminated solids are selected from the group consisting of drill cuttings, drilling mud, oil contaminated soil, and combinations thereof, an oleaginous phase substantially composed of linear paraffins, a non-oleaginous phase including a non-oleaginous fluid and a salt of a biodegradable anion, an emulsifying agent, a bulking agent, and a compostable nitrogen source.

12. The vermiculture composition of claim 11 wherein the nitrogen and carbon content has a ratio of about 2:1 to about 100:1.

* * * * *